(12) United States Patent
Ng et al.

(10) Patent No.: US 8,789,252 B2
(45) Date of Patent: Jul. 29, 2014

(54) APPARATUS FOR INSTALLING BELT FASTENERS ON CONVEYOR BELTS

(75) Inventors: Pan Yim Ng, Chicago, IL (US);
Kenneth J. Bargo, Chicago, IL (US);
William R. Wawczak, Glen Ellyn, IL (US); Gregory Westphall, Naperville, IL (US)

(73) Assignee: Flexible Steel Lacing Company, Downers Grove, IL (US)

( * ) Notice: Subject to any disclaimer, the term of this patent is extended or adjusted under 35 U.S.C. 154(b) by 432 days.

(21) Appl. No.: 13/191,128

(22) Filed: Jul. 26, 2011

(65) Prior Publication Data
US 2013/0025108 A1    Jan. 31, 2013

(51) Int. Cl.
*B23P 11/00*        (2006.01)
(52) U.S. Cl.
USPC ..................................................... 29/243.51
(58) Field of Classification Search
CPC ............. F16G 3/003; F16G 3/16; F16G 3/04; F16G 3/02; B25B 31/00; B25B 1/103
USPC ........ 29/243.51, 432.1, 798; 227/60, 61, 143, 227/144
See application file for complete search history.

(56) References Cited

U.S. PATENT DOCUMENTS

| | | | |
|---|---|---|---|
| 4,538,755 A | 9/1985 | Schick | |
| 5,848,463 A | 12/1998 | Herold | |
| 6,488,144 B2 | 12/2002 | Winkelman et al. | |
| 7,568,269 B2 | 8/2009 | Atkins et al. | |

OTHER PUBLICATIONS

Notification of Transmittal of the International Search Report and the Written Opinion of the International Searching Authority, or the Declaration from the International Bureau of WIPO for corresponding International Application No. PCT/US2012/048234, dated Oct. 10, 2012, 10 pages.

*Primary Examiner* — David Bryant
*Assistant Examiner* — Moshe Wilensky
(74) *Attorney, Agent, or Firm* — Fitch, Even, Tabin & Flannery, LLP

(57) ABSTRACT

An apparatus and method for applying staple belt fasteners to conveyor belts are provided that allow staple belt fasteners to be installed on an end of the belt with the use of a single applicator tool and such that all of the staples of the fasteners in the tool are first initially set and then are finally set. In one form, the apparatus has a base with an anvil mounted thereto with the anvil having both initial and final set portions. The belt fastener applicator tool provides for relative shifting of the anvil and a guide device having through openings to align either the initial or final set portions of the anvil with the guide device through openings. The guide device through openings are preferably configured to receive a staple drive member therein.

20 Claims, 24 Drawing Sheets

APPARATUS FOR INSTALLING BELT FASTENERS ON CONVEYOR BELTS

FIELD OF THE INVENTION

The application relates to an apparatus and method for applying belt fasteners to conveyor belts and, more particularly, an apparatus and method for applying staple belt fasteners along ends of conveyor belts.

BACKGROUND OF THE INVENTION

Generally, it is known that hinged belt fasteners having preset or prestaked staples require that two distinct staple setting operations take place to provide the required low profile for the staples of the fasteners when installed on the end of a conveyor belt. The first operation initially sets the legs by driving the staples through the apertures of the upper leg or plate member in which they are held, through the belt, through aligned apertures in the lower leg or plate member of the fasteners, and then against an anvil surface that starts to bend the staple legs for eventually being oriented substantially parallel to the lower leg or plate member of the fastener when finally set. The final setting operation involves applying a drive force to the staple to drive the bent, initially set staple legs against an anvil so they are further bent to be received in a pocket in the lower fastener member so as not to project out of the pocket. For these different staple setting operations, different anvil configurations need to be employed.

In one known example, Applicant's assignee herein has a series of Ready Set™ (RS) staple belt fasteners having upper and lower plate members interconnected by a pair of arcuate hinge loops. The upper plate has the legs of a pair of staples held in apertures in respective pockets of the upper plate with aligned apertures in respective lower pockets of the lower plate. These fasteners are shown in Applicants' assignee's U.S. Pat. No. 5,638,582, the disclosure of which is incorporated as if reproduced in its entirety herein. Bridge portions between lower plate members of adjacent RS fasteners connect the fasteners in a strip.

The RS belt fasteners are applied to belt ends via the use of two separate tools each having anvils that are specially configured for the operation they perform. The first tool has anvils fixed to a base channel that are configured to provide an initial set for the staple legs while the other tool has anvils fixed to another base channel that are configured to provide the staple legs with their final set. Both tools use comb members for aligning the staple legs with the anvils. This is of particular importance with respect to the initial set tool where the anvils have wells that are specially configured to direct the legs toward each other in an offset manner so that they can pass adjacent to each other when finally set. The tools also have guide blocks with over-center clamps that are operable to cause the lower plates of the fasteners to be pushed against the anvils. The guide blocks have through openings configured to receive a nose of a power drive tool, such as a pneumatic driver, that has a drive punch for engaging the crown or head of the staples aligned with the guide block openings, such as described in Applicant's assignee's U.S. Pat. No. 7,568,269, the disclosure of which is incorporated as if reproduced in its entirety herein.

After all of the staple legs on each of the fasteners in a strip are initially set, the clamps are released and the belt end is pulled out of the initial set tool and put into a similar final set tool, albeit with different anvil plates. These anvil plates generally have a flat anvil surface against which the bent, initially set staple legs are driven to seat these in the pockets of the lower plate in a cross-wise fashion to generate a high quality final set of the staple legs so that they do not project out of the lower plate pockets. Alternatively, it is known that, rather than take the time to load the belt with the initially set staples into another tool, installers may simply flip the belt over and, using a hammer, deliver hammer blows to the initially set staple legs to drive them into the pockets of the lower plates.

Applicant's assignee provides another tool for applying a different hinged belt fastener that has preset staples. In the F-series fasteners, the staples are held in apertures formed in a pocket of an upper leg of the fastener which are driven through the belt and into apertures formed in a pocket of the lower leg of the fastener. However, the applicator tool is operable to perform both the initial set and the final set of the staple legs without requiring that the conveyor belt be unclamped from an initial set tool for being inserted into a different tool for the final set operation.

In the F-series applicator tool, there is a floor mounted frame that supports an elevated, inclined bed that is elongated and which has through openings or slots therein. The strip of F-series fasteners interconnected by a wire welded to the fasteners is turned upside down so that the heads of the staples are first fit into the slots in the bed followed by the legs. The belt is then inserted between the fastener legs into engagement with the belt stops of the fasteners with the belt then being clamped adjacent to the bed so that the bed extends along its length laterally across the width of belt. An indexing head is mounted to the bed and is indexed therealong for being aligned relative to the fasteners for the driving operations of the staple legs to set them into the pockets of the fastener legs.

For this purpose, the head carries both a final set anvil sized to finally set legs for staples of a pair of adjacent fasteners and an adjacent, initial set anvil sized for initial setting of the legs of staples of a pair of adjacent fasteners with the initial set anvil having oblique channels for receiving and bending the legs therein. The anvils are mounted to an upper portion of the head, and staple punches are carried by a lower portion of the head. The upper and lower portions are connected to each other and are movable by manual operation of a staple setting lever along with the respective anvils and punches.

The head includes an indexing mechanism having an indexing arm that fits into the slot openings of the bed for precisely aligning the initial set anvil and final set anvil with the staple legs. An advance lever separate from the setting lever is connected to the indexing mechanism for being operated to index the head down the length of the bed. After indexing the head, a single operation of the manual setting lever causes both the initial set and final set anvils to shift down towards the bed and causes the punches to shift upwardly in a sequential manner through the openings so that adjacent pairs of staples are sequentially driven for an initial set of one pair of the staples and then a final set of the adjacent pair of staples. After the setting operation, the head is advanced by a pair of openings via operation of the advance lever with the initial set anvil leading followed by the trailing, final set anvil so that the final set anvil is now aligned with the staple legs that were previously initially set and the initial set anvil is aligned with staples in bed openings that have not yet been driven through the belt for initial setting.

As is apparent, the F-series applicator tool requires that the head be precisely indexed for aligning the anvils, and particularly so with the initial set anvil, so that the legs properly fit into the oblique channels for being initially set. Also, because the tool head comingles the initial set and final set staple driving operations for adjacent fasteners which both occur by a single manual pull of the setting lever, it is required that the head be sequentially advanced from one end of the bed to the other without skipping over fasteners so that only initially set staples are driven against the final set anvil. In other words, the head cannot be advanced to various locations along the belt end such as can be done with the applicator tools for the RS fasteners where there is a separate pneumatic power tool utilized to drive the staples and the initial and final set anvils are in separate tools.

SUMMARY OF THE INVENTION

In accordance with one aspect of the invention, an apparatus and method for applying staple belt fasteners to conveyor belts are provided that allow staple belt fasteners to be installed on an end of a conveyor belt with the use of a single installation or applicator tool and such that all of the staples of the fasteners in the tool are first initially set and then are finally set. In this regard, the apparatus has a base with an anvil mounted thereto. The anvil has both initial and final set portions so that both the initial and final setting drive operations for the staples occur in the same tool unlike the prior RS applicator tool. Further, unlike the prior F-series applicator tool, the tool herein avoids an anvil carrying head that needs to be precisely indexed and advanced along the tool. Instead, the belt fastener applicator tool herein provides for relative shifting of the anvil and a guide device having through openings thereof to align either the initial or final set portions of the anvil with the guide device through openings. The guide device through openings are preferably configured to receive a staple drive member therein. In this manner, the tool herein allows for the staples of all of the fasteners in the tool to be initially set, and then, without removing the belt and fasteners thereon from the tool, the initially set staples of all of the fasteners in the tool can be finally set.

In one form of the invention, the base has an elongate configuration, and the anvil initial set portions and final set portions are each arranged in respective rows lengthwise along the base. An actuator is operable to shift the anvil and the guide device relative to each other in a fore-and-aft direction widthwise across the base. Preferably, the actuator has an initial set position in which the guide device through openings are aligned with the initial set portions, and a final set portion distinct from the initial set position in which the guide device through openings are aligned with the final set portions. In this manner, the tool is provided with distinct initial and final set configurations that the operator sets by shifting of the actuator, and there is no comingling of the initial and final set driving operations. Instead, when the operator shifts the actuator to the initial set position, only initial set driving operations can occur in the tool. Likewise, when the operator shifts the actuator to the final set position, only final set driving operations can occur in the tool.

In a preferred form, the anvil is mounted for translation in the fore-and-aft direction on the base by operation of the actuator.

In another form, a belt clamping and alignment mechanism is provided for aligning legs of staples of the staple belt fasteners on an end of a conveyor belt with one of the anvil set portions. The belt clamping and alignment mechanism includes the anvil and the guide device between which the belt having the staple belt fasteners thereon is clamped after the actuator has been operated to shift the anvil and guide device relative to each other to align the anvil initial set portions with the guide device through openings. Preferably, the belt clamping and alignment mechanism including the anvil and the guide device thereof are mounted to the base so that with the anvil initial set portions aligned with the guide device through openings, operation of the actuator causes the belt clamping and alignment mechanism to lift the clamped belt and fasteners off the anvil, the anvil to translate on the base for aligning the final set portions with the guide device through openings, and the belt clamping and alignment mechanism to lower the clamped belt and fastener so that initially set legs of the staple belt fasteners are supported on the final set portions of the anvil.

In another form of the invention, the actuator is operable to shift the anvil and guide device relative to each other on the base, and the actuator has an initial set position in which all of the through openings of the guide device are aligned with corresponding ones of the anvil initial set portions, and a final set portion in which all of the through openings of the guide device are aligned with corresponding ones of the anvil final set portions. In this manner, a staple drive member of a drive tool can be utilized to first initially set all of the fasteners in the tool, and then, after shifting of the actuator to the final set position, can be utilized to finally set all of the initially set fasteners in the tool.

In a preferred form, the guide device includes multiple guide blocks each with multiple guide through openings with all of the guide through openings of the multiple guide blocks being aligned with either the anvil initial set portions with the actuator in the initial set position or the anvil final set portions with the actuator in the final set portion.

In one form, the guide device includes a clamping device operable to clamp the belt and fasteners thereon between the guide device and the anvil with the actuator in the initial set position. A belt lift mechanism is pivotally mounted for pivoting relative to the base. Shifting of the actuator from the initial set portion position to the final set position causes the belt lift mechanism to pivot upwardly and lift the clamped belt upwardly, the anvil to translate along the base to align the guide device through openings with the anvil final set portions, and the belt lift mechanism to pivot downwardly to lower the lifted clamp belt so that initially set staples are on the anvil final set portions. Keeping the belt clamped until the initially set staple legs are on the anvil final set portions ensures that the staple legs and anvil final set portions are properly aligned for the final set driving operations for a high quality final set of the initially set staple legs.

In another form, a fastener alignment device can be provided for positioning the staple belt fasteners on a belt end so that staples thereof are in alignment with the guide device through openings. The anvil, the fastener alignment device, and the belt lift mechanism are arranged so that as the actuator shifted from the initial set position to the final set position, the belt lift mechanism pivots upwardly and engages the fastener alignment device for causing upward pivoting thereof to lift the clamp belt and belt fasteners thereon upward to allow the anvil to be translated thereunder.

The guide device and the fastener alignment device may include a mounting plate for being mounted thereto and a releasable hold down mechanism that is operable to draw the mounting plate down toward the base with the actuator in the initial set position, and being released for pivoting of the mounting plate including the guide device and the fastener alignment device mounted thereto as the actuator shifted from the initial set position to the final set position. The handle can include a handle lock device operable to releasably lock the handle in the initial set position with the releasable hold down mechanism operable to draw the mounting plate down toward the base.

In another form, the base has an elongate configuration including a length thereof, the anvil includes anvil members arranged alongside each other along the length of the base and having gap spacings therebetween, and the belt lift mechanism includes lift members arranged in the gap spacings for pivoting therein with operation of the actuator. The anvil members can each include the initial and final set portions with the initial set portion including recesses in each of the anvil members and the final set portion being a substantially flat surface of each of the anvil members.

In one form, the actuator includes a handle, and a cam mechanism is mounted to the base and connected to the handle to be operable thereby to cause the relative shifting between the anvil and the guide device when the handle is shifted between the initial and final set positions thereof.

In another aspect of the invention, a method of applying staple belt fasteners to conveyor belts is provided including clamping a conveyor belt and multiple staple belt fasteners thereon in a belt fastener applicator tool, driving staples of all of the staple belt fasteners in the tool against initial set portions of an anvil of the tool to initially set legs of the staples of all of the staple belt fasteners in the tool, shifting the clamped conveyor belt and the anvil relative to each other so that final set portions of the anvil are aligned with the initially set staple legs of the staples of all of the staple belt fasteners in the tool, and driving the initially set staple legs against the anvil final set portions to finally set the staple legs of the staples of all of the staple belt fasteners in the tool.

In one form, the belt and fasteners are clamped in the tool by a belt clamping and alignment mechanism. The method further includes urging the belt clamping and alignment mechanism toward a base of the tool during driving of the staples for initially setting the legs thereof, and supporting and retaining the belt clamping and alignment mechanism on the base without urging it toward the base during driving of the staples for finally setting the legs thereof.

In another form, the staples are driven against the initial set portions by initially driving a staple or staples of an end belt fastener at one of the ends of the multiple staple belt fasteners clamped in the tool, then driving a staple or staples of the other end belt fastener at the other end of the clamped multiple staple belt fasteners in the tool, then driving a staple or staples of a middle belt fastener between the end belt fasteners, and then driving a staple or staples of remaining ones of the clamped multiple staple belt fasteners in the tool.

BRIEF DESCRIPTIONS OF THE DRAWINGS

Figure 9:
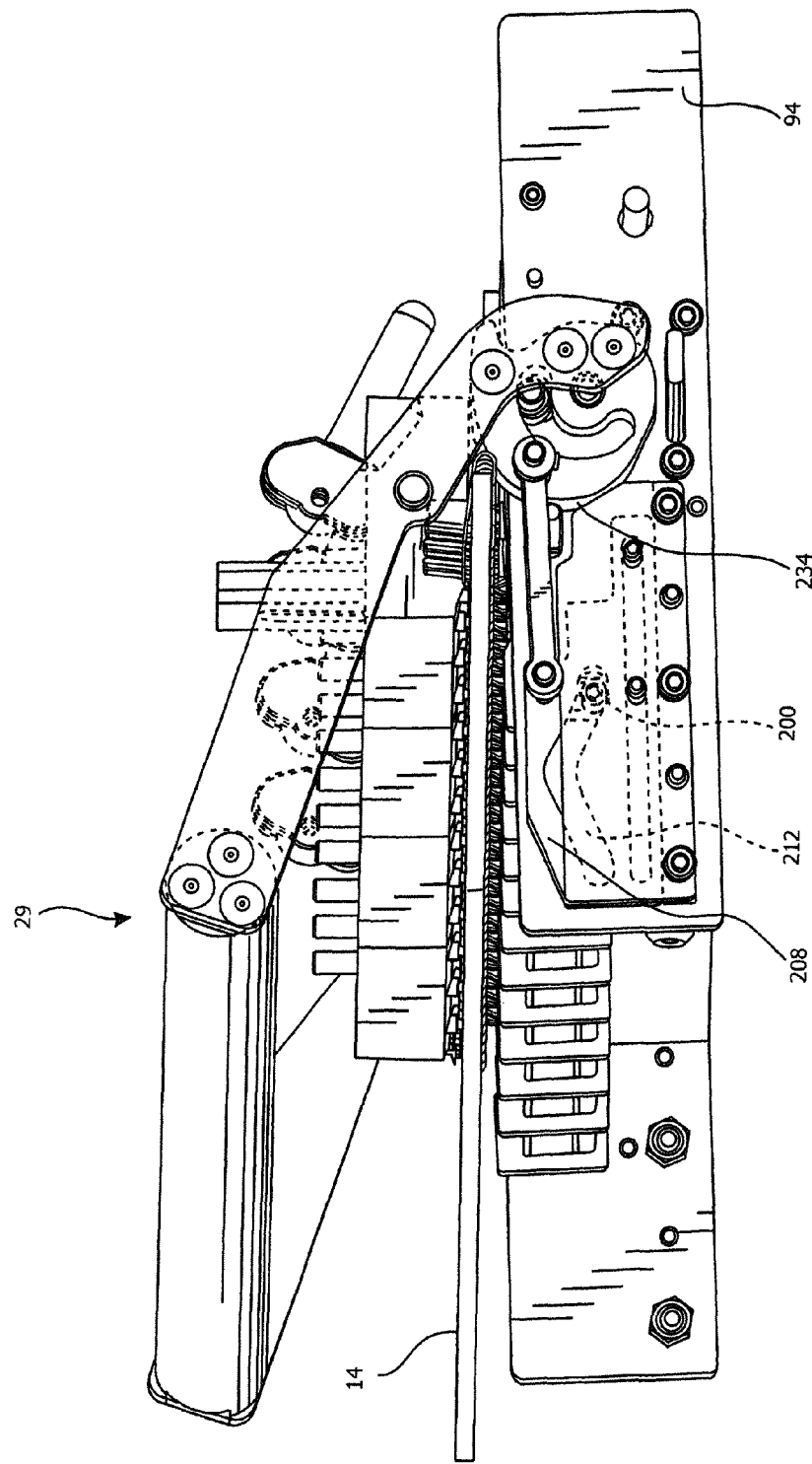
Figure 10:
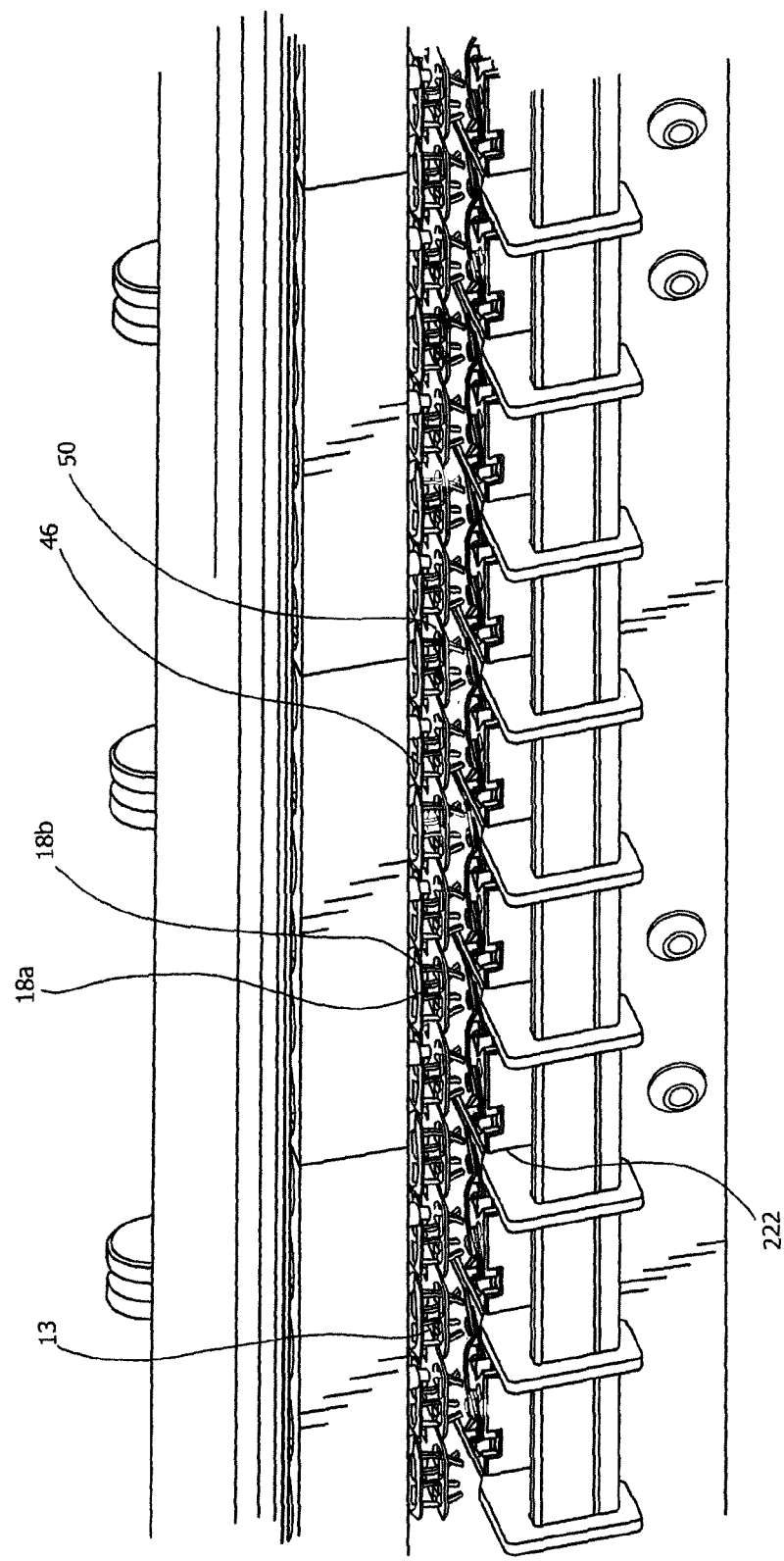
Figure 11:
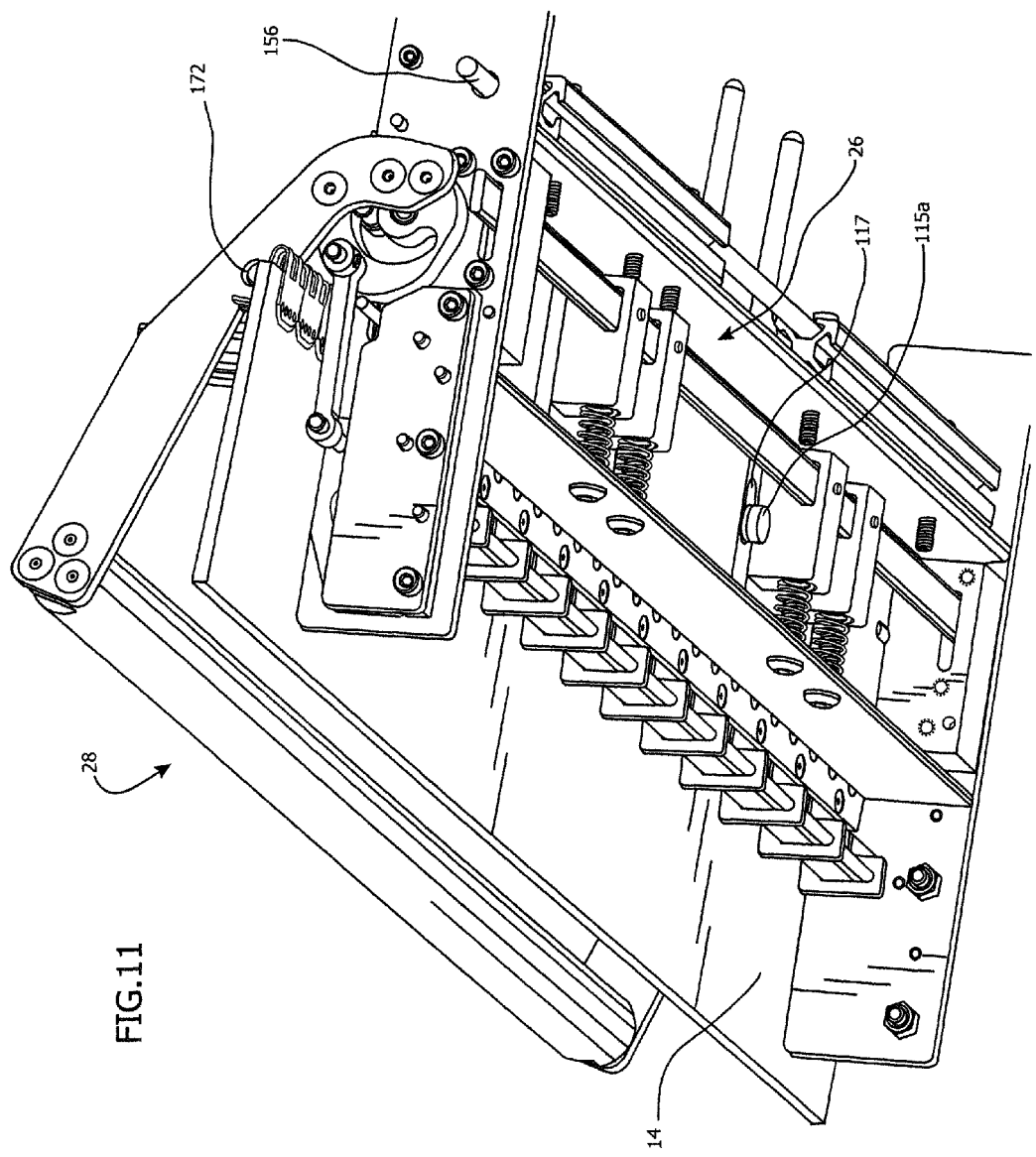
Figure 12:
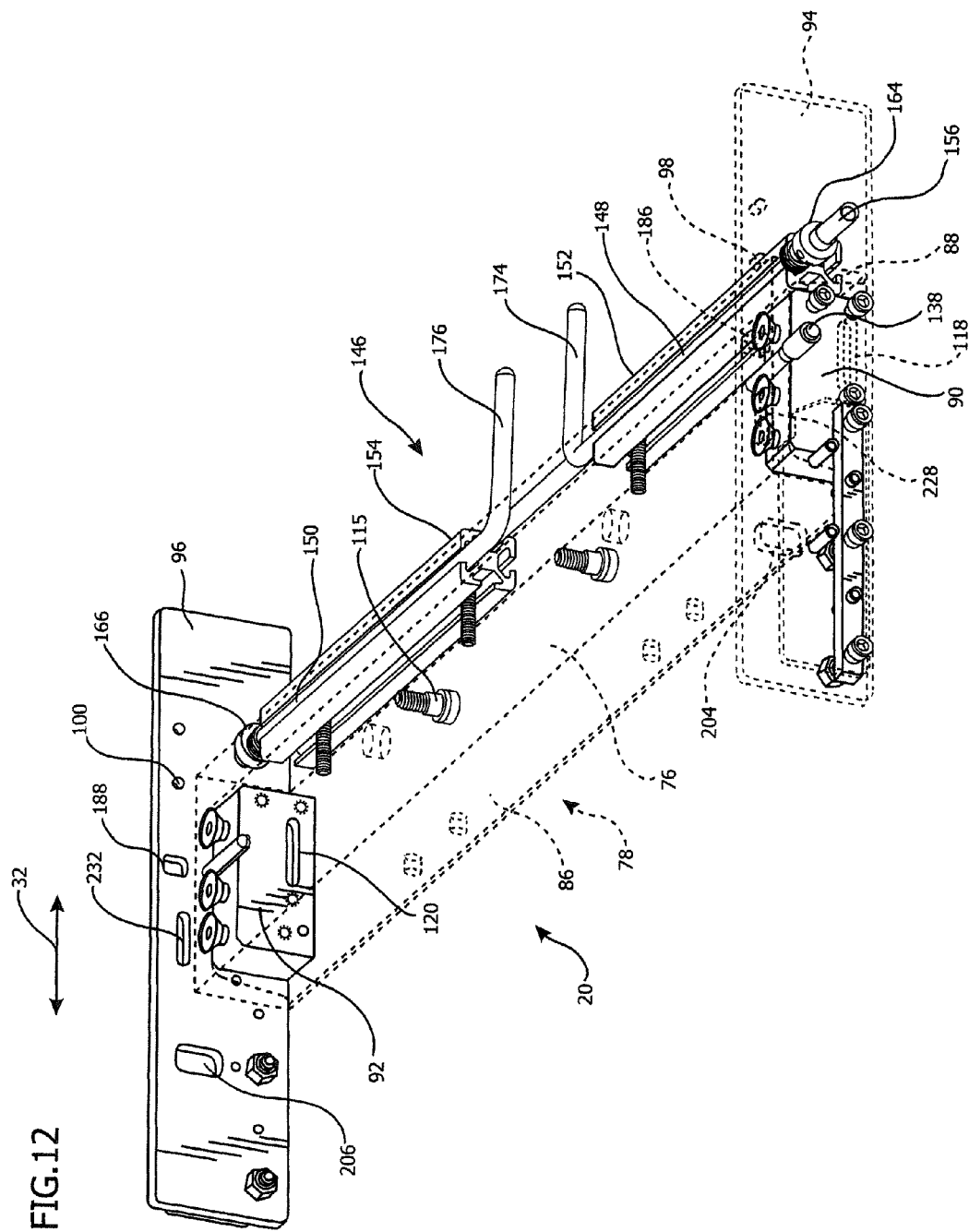
Figure 13:
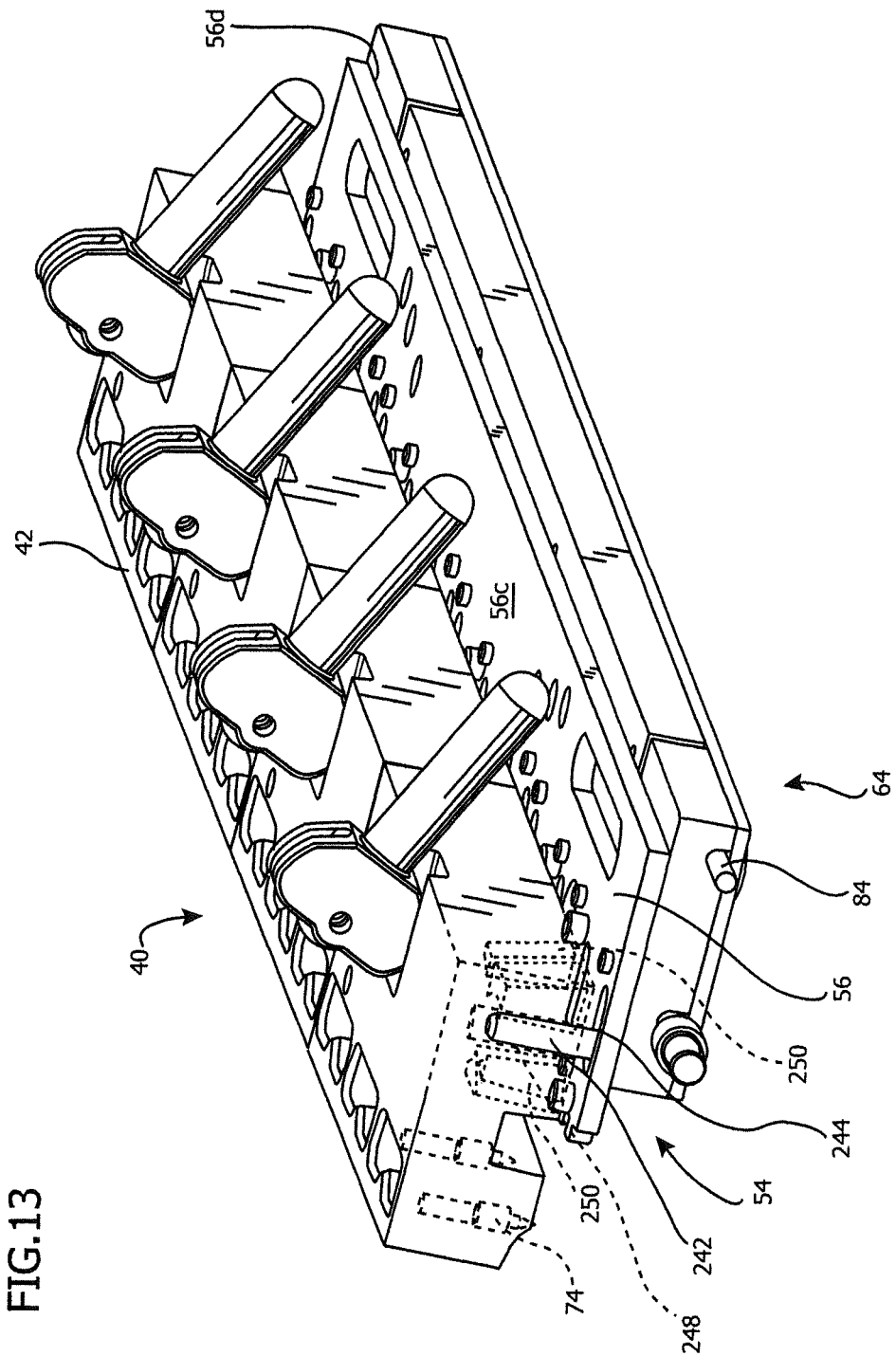
Figure 14A:
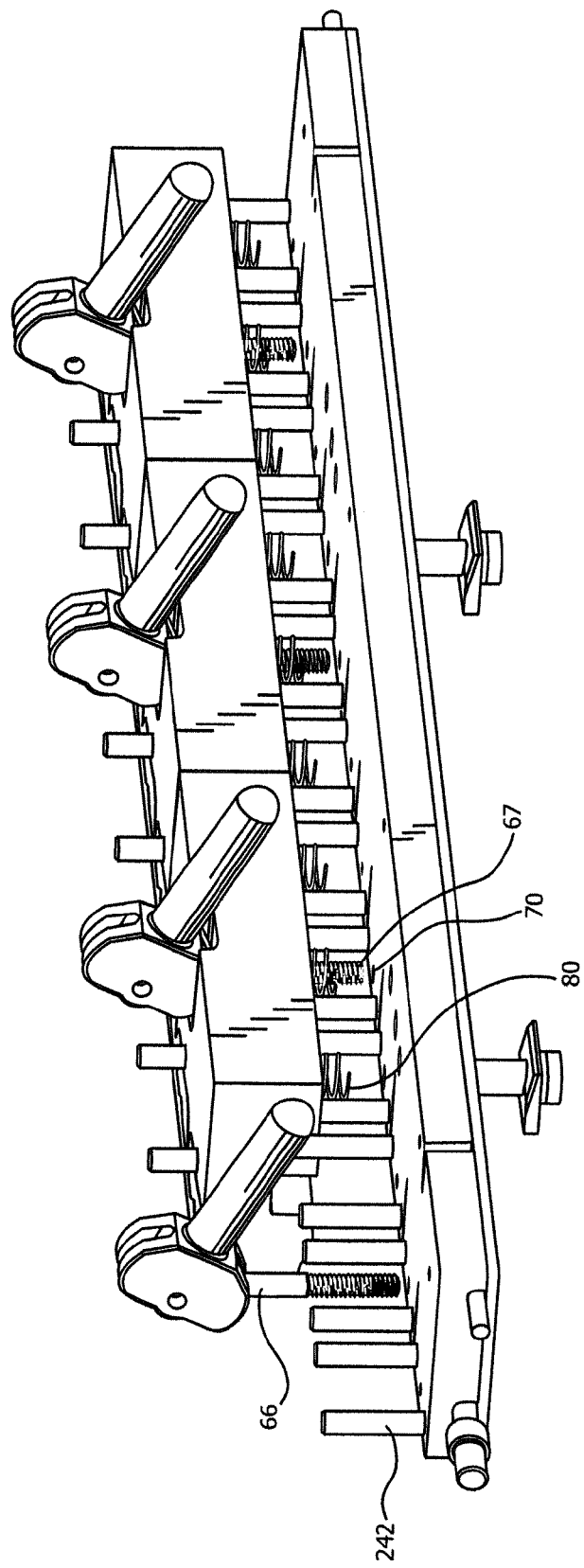
Figure 14B:
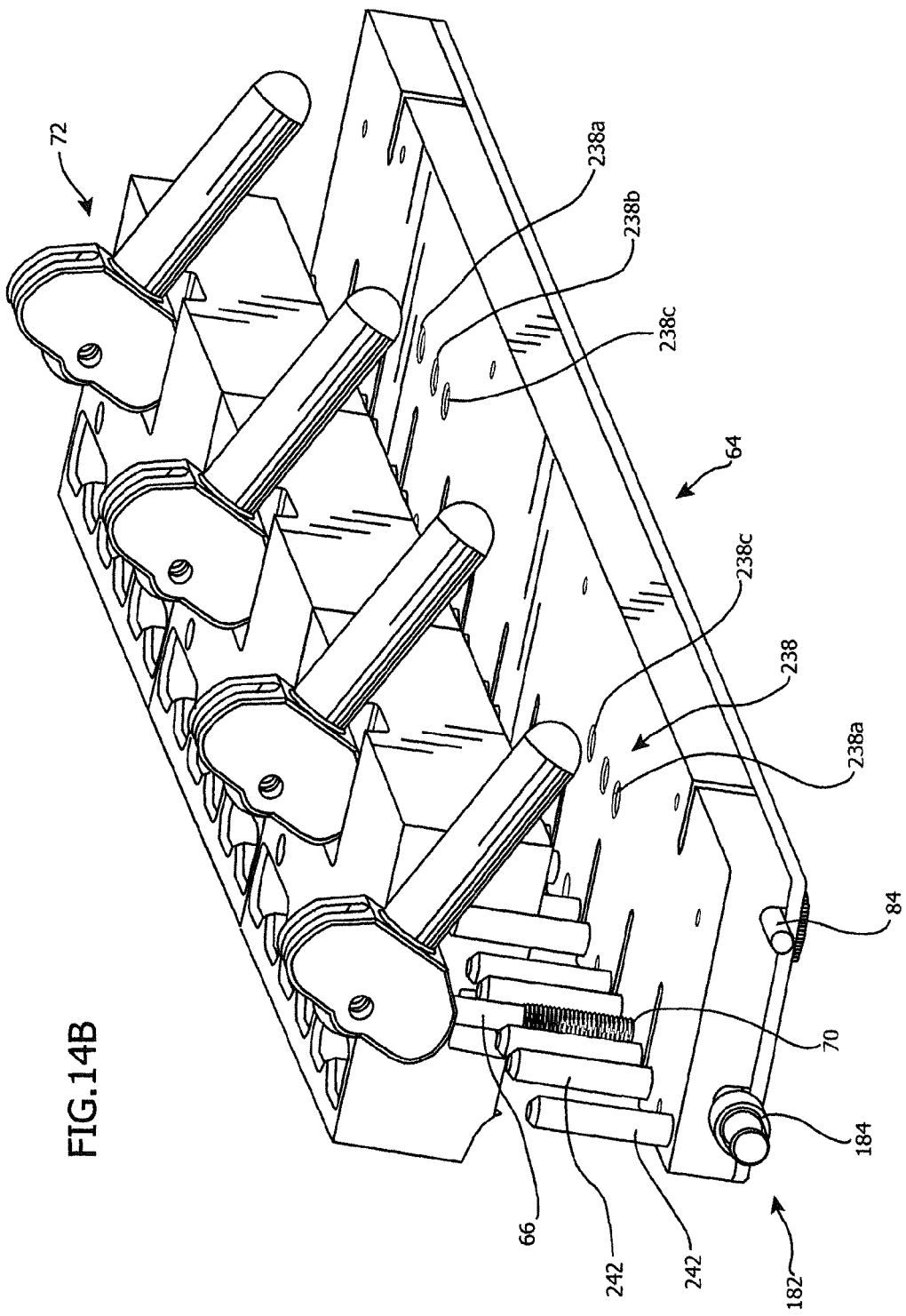
Figure 15:
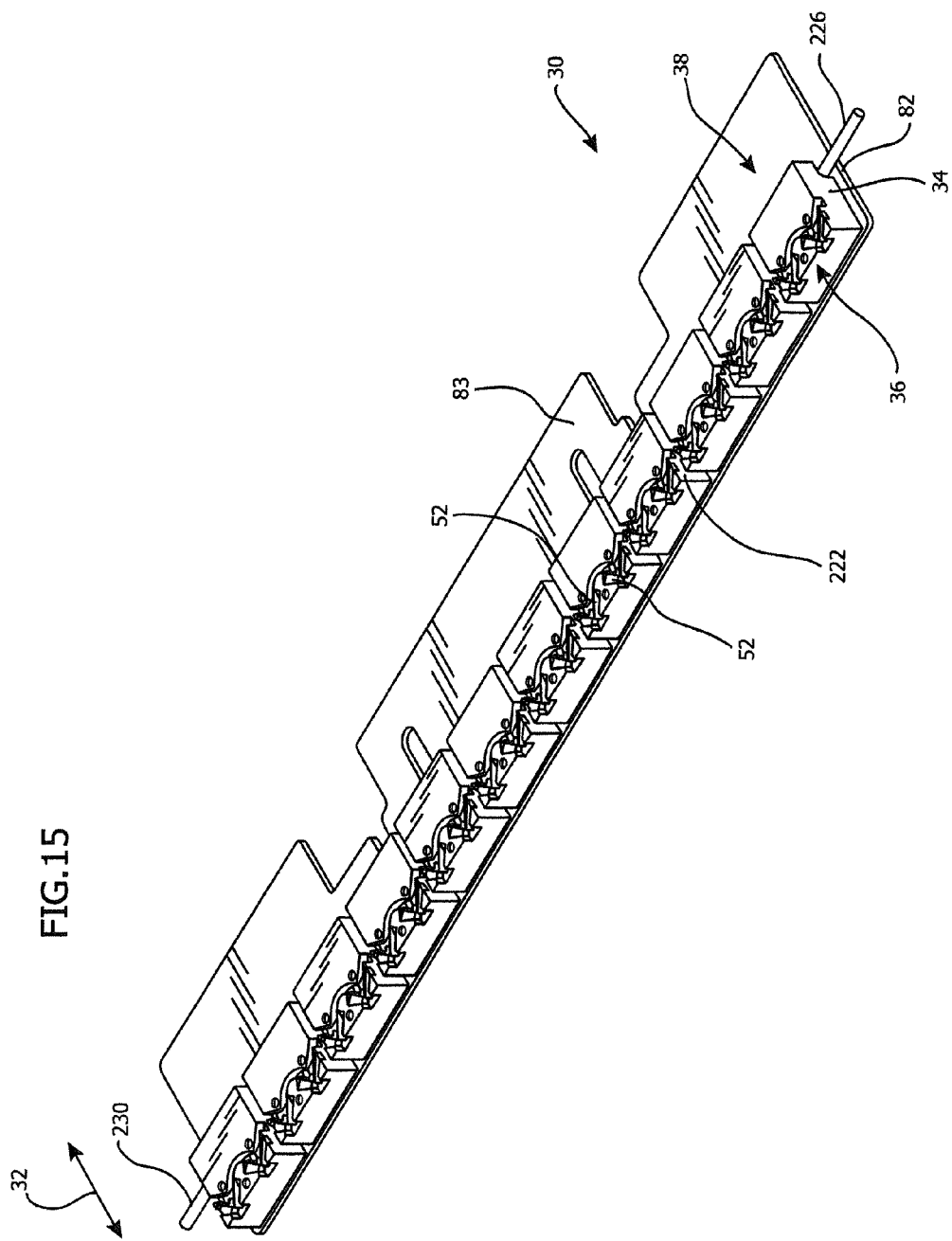
Figure 16:
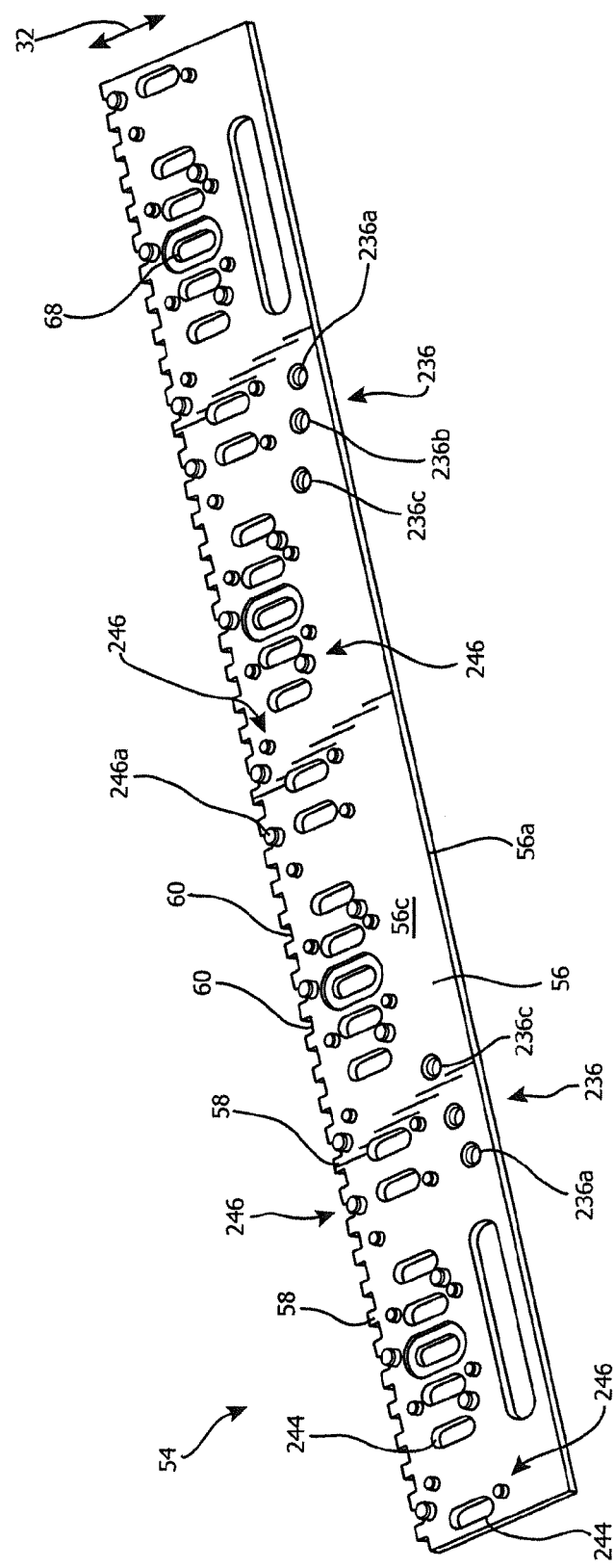

FIG. 9 is a perspective view of the belt fastener applicator apparatus with the handle side plate member and the guard plate in phantom and showing the handle pivoted forwardly to the final set position and a curved, outer cam surface of the cam disk engaged with a pin of the anvil assembly to push the anvil assembly forwardly so that the rearward final set portions of the anvils are aligned with the initially set staple legs;

FIG. 10 is an enlarged perspective view of the belt fastener applicator apparatus with the handle in the final set position as in FIG. 9 and the conveyor belt removed to show the initially set staple legs supported on the final set portions of the anvil members;

FIG. 11 is a bottom perspective view of the installation tool showing the handle in the final set position and the hold down mechanism released;

FIG. 12 is a perspective view of the base assembly showing the channel member having side frame plates secured thereto at either longitudinal end thereof via mounting blocks and further showing handle lock rods for locking the handle in the initial set position;

FIG. 13 is a perspective view of the guide blocks and the comb plate for being secured to a lower pivot mounting plate and having one of the end guide blocks in phantom to show guide posts of the pivot mounting plate extending up through guide slots of the comb plate;

FIGS. 14A and 14B are perspective views similar to FIG. 13 with the comb plate and the end guide block removed to show the clamp shaft for being secured to the lower, pivot mounting plate;

FIG. 15 is a perspective view of the anvil assembly showing the anvil members secured to a slide mounting plate;

FIG. 16 is a perspective view of an adjustable comb plate showing varying height risers operable to engage the guide blocks for different size fasteners and fastener size adjustment apertures for receiving a detent pin.

Figure 17:
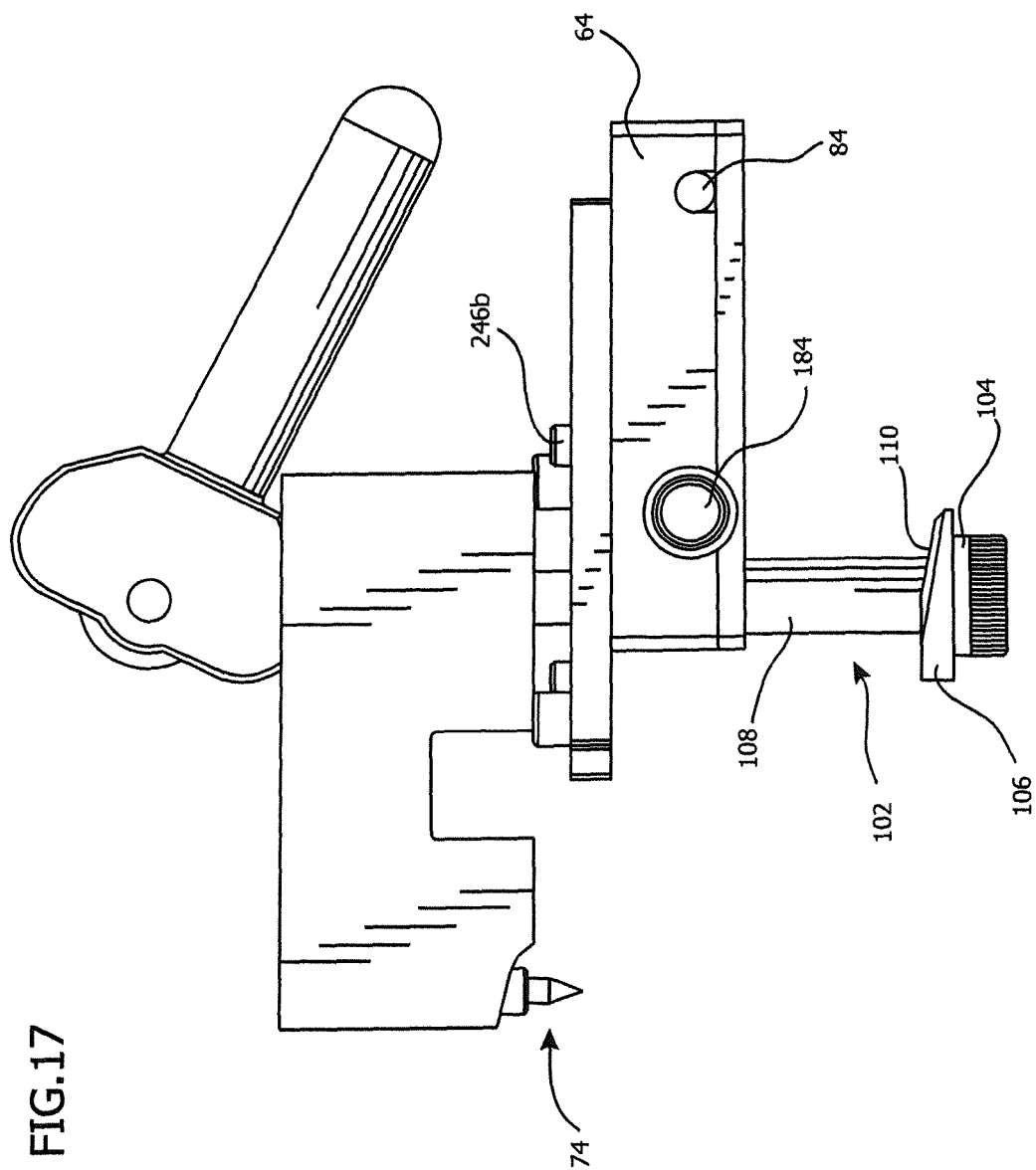
Figure 18:
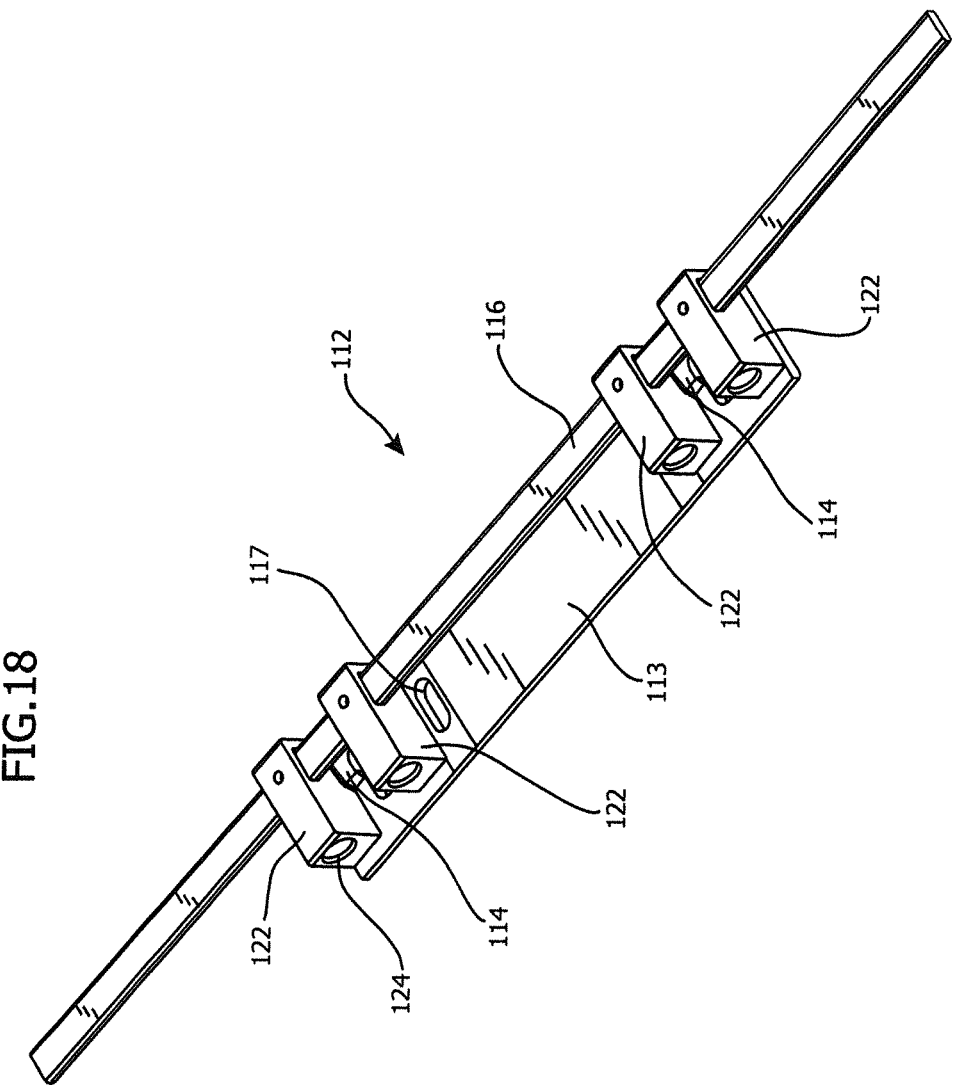
Figure 19:
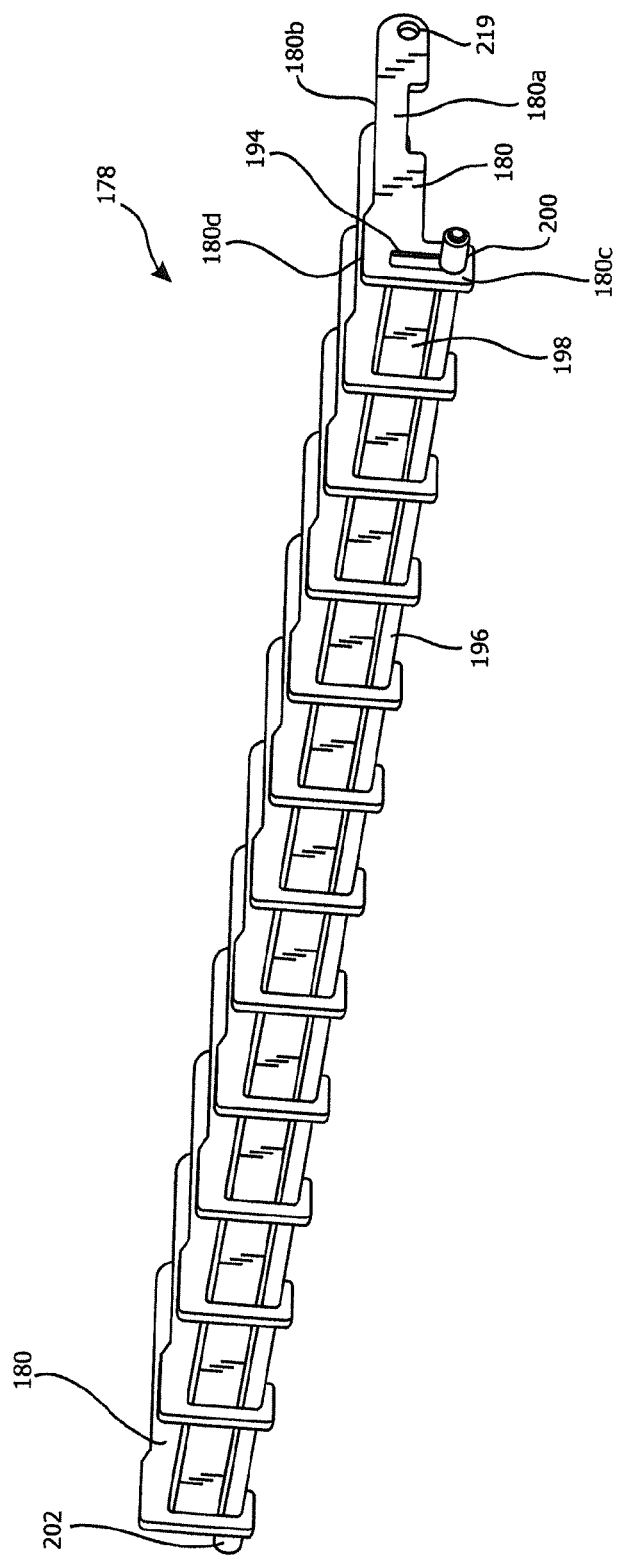
Figure 20:
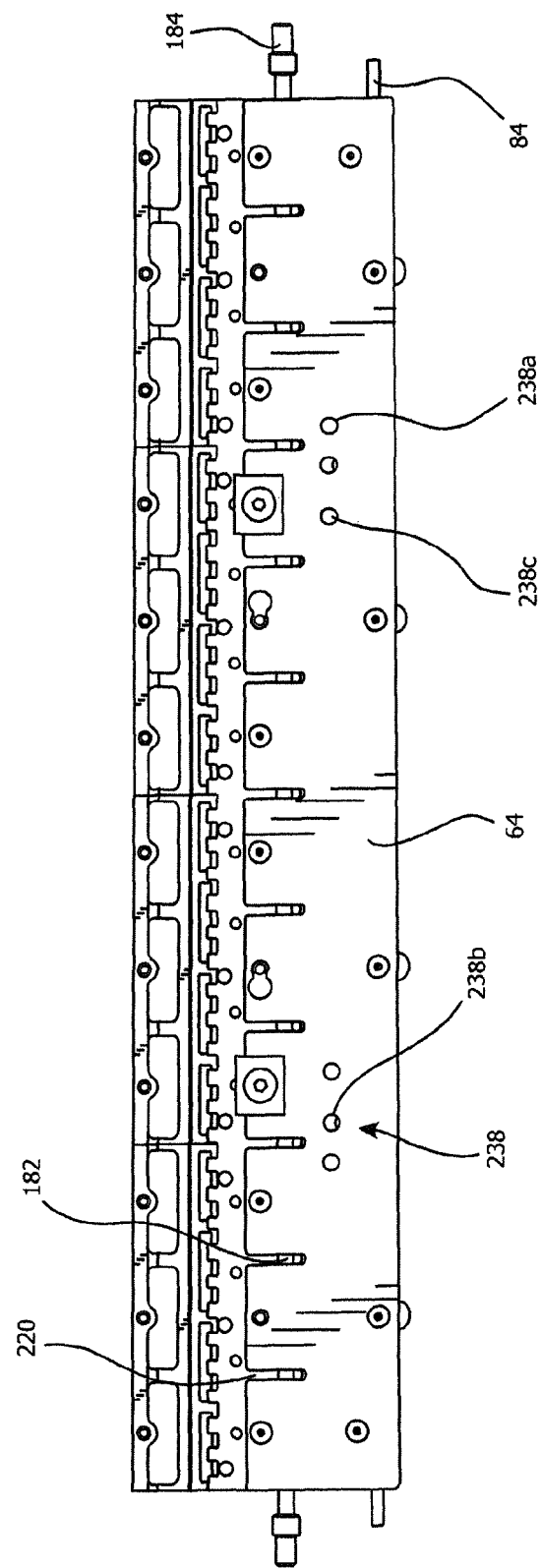
Figure 21A:
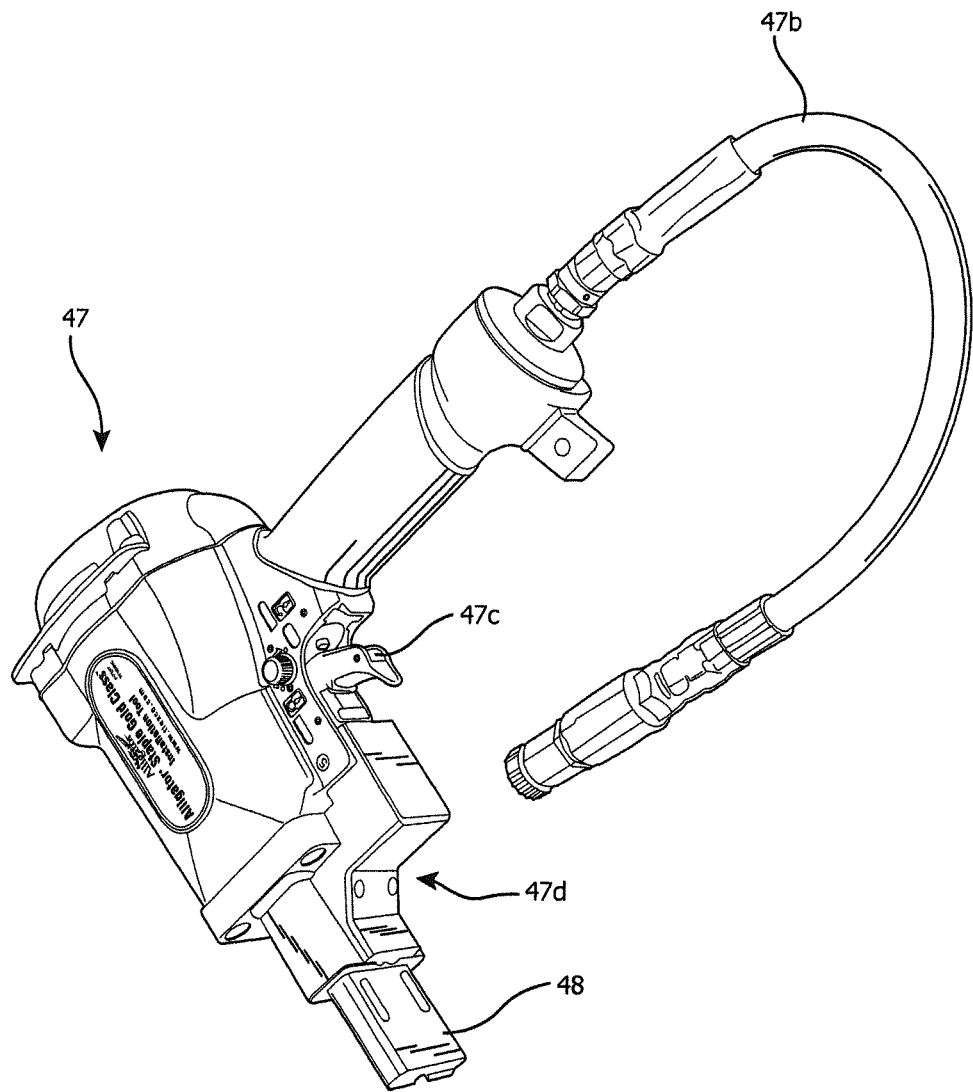
Figure 21B:
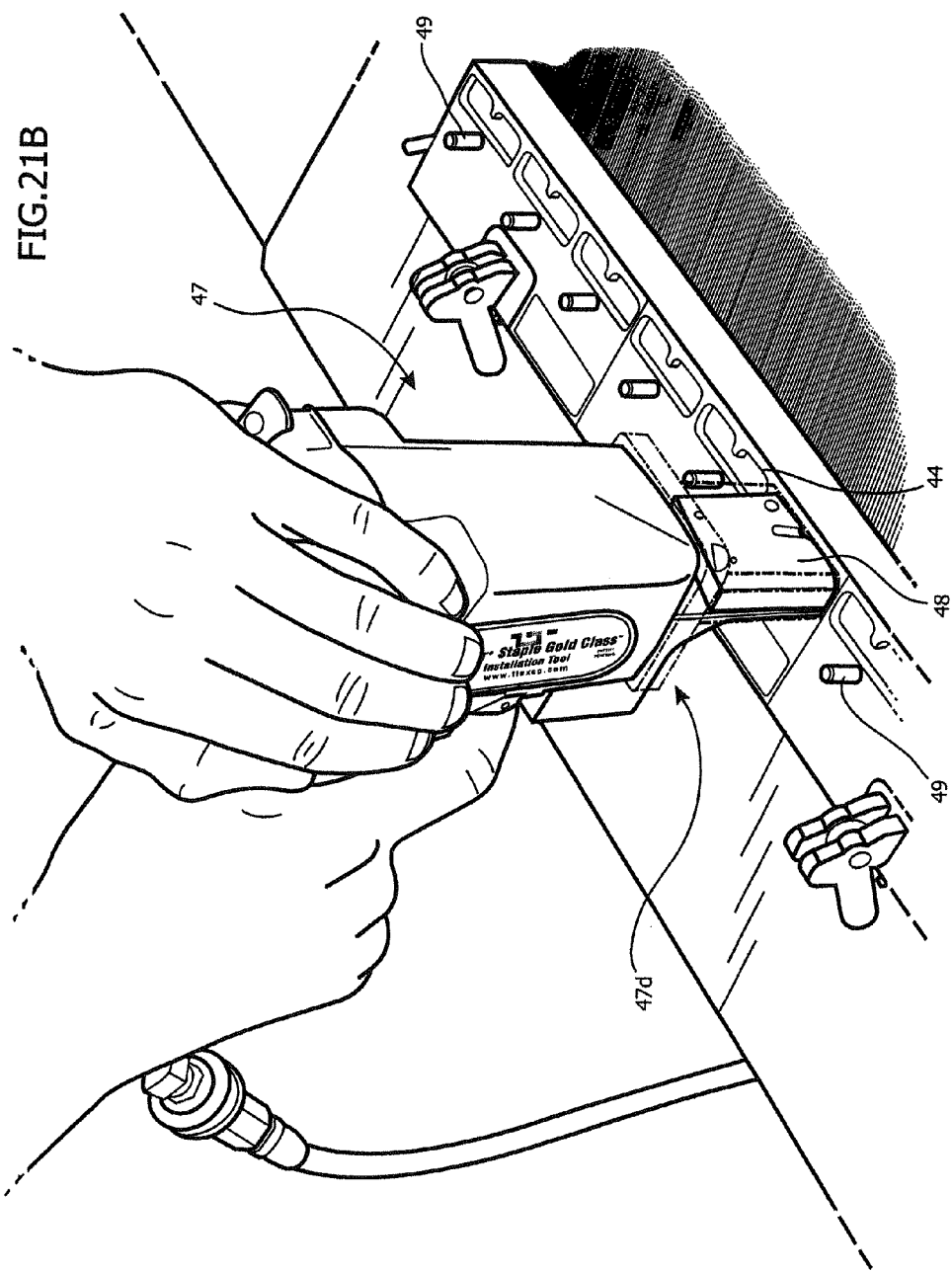
Figure 21C:
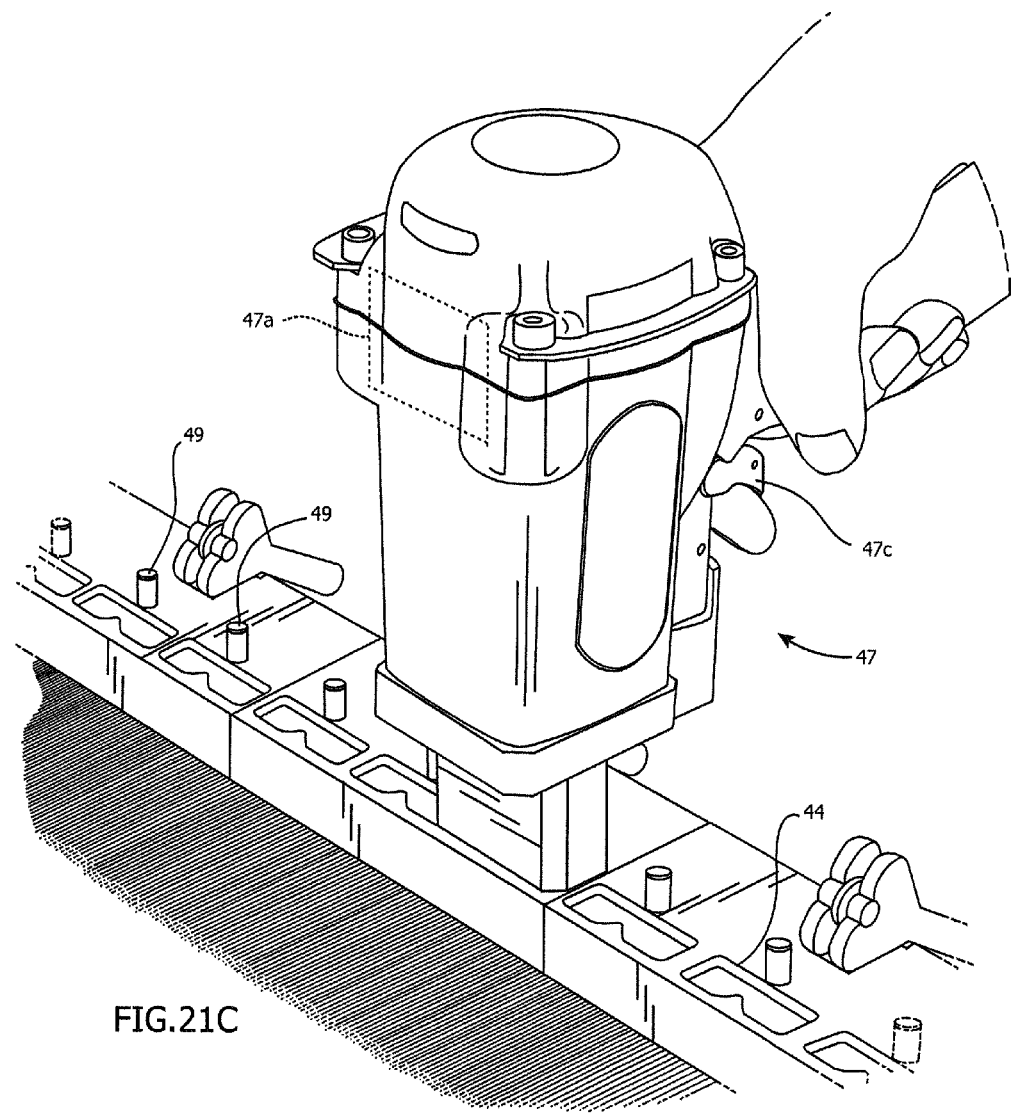

FIG. 17 is an elevational view of a belt clamping and alignment mechanism showing a guide block, a comb plate, and a pivot mounting plate of the mechanism with the pivot mounting plate including a shaft carrying a wedge member of the hold down mechanism;

FIG. 18 is a perspective view of a wedge device of the hold down mechanism showing a mounting plate having wedge surfaces thereon between pairs of mounting blocks for supporting an actuating beam;

FIG. 19 is a perspective view of a belt lift mechanism showing multiple belt lift plate members interconnected by a connecting beam;

FIG. 20 is a bottom plan view of the belt clamping and alignment mechanism showing forward opening slots of the pivot mounting plate for pivotally mounting the belt lift plate members therein; and FIGS. 21A-21C are perspective views of a pneumatic power tool having a pneumatic motor operable for driving the drive member in one of the guide openings for initial and final set drive operations on the staples.

DETAILED DESCRIPTION OF PREFERRED EMBODIMENTS

Figure 1:
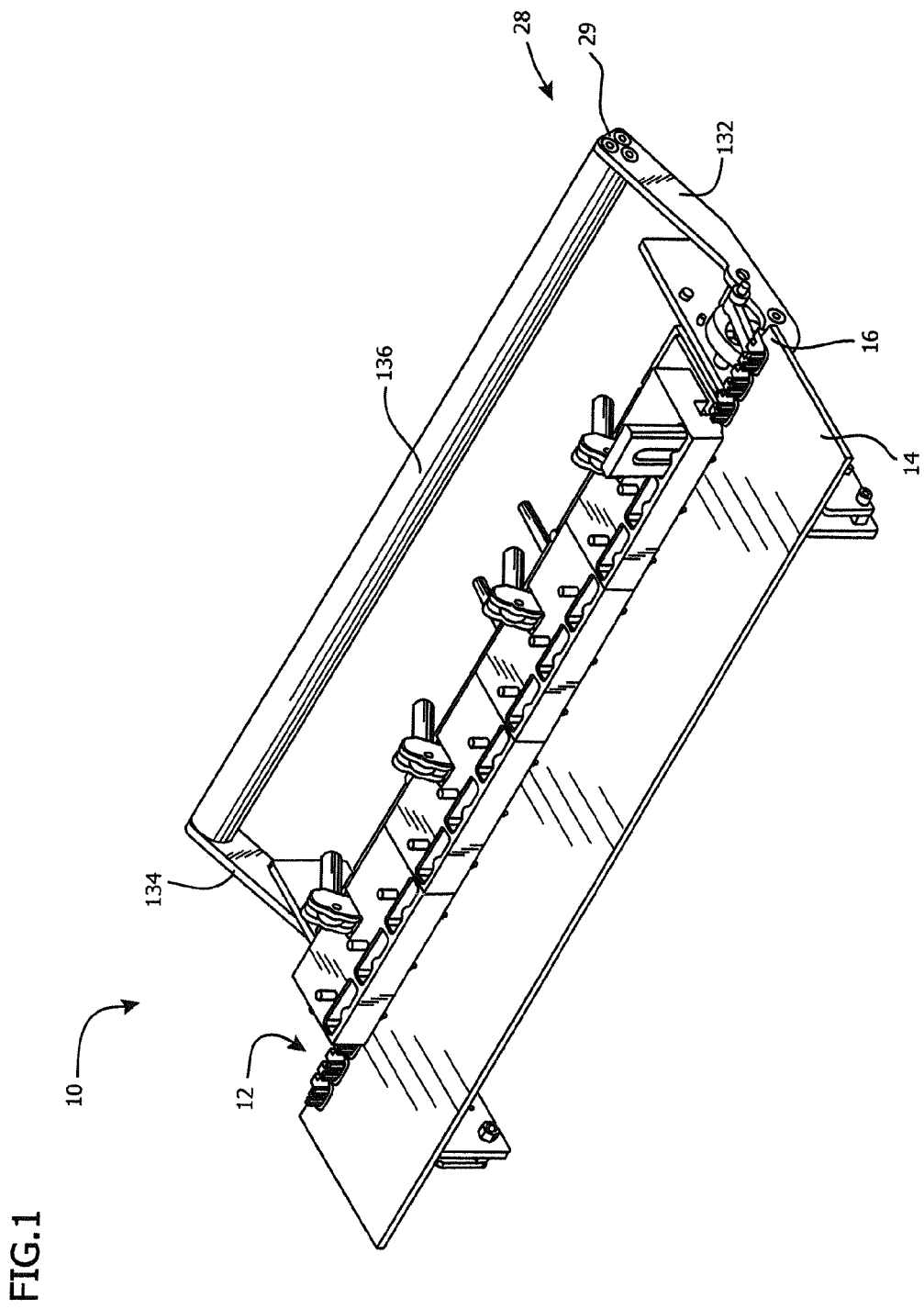
FIG. 1 is a perspective view of an apparatus for applying staple belt fasteners to an end of a conveyor belt showing a handle pivoted rearwardly to a locked, initial set position.
Figure 2:
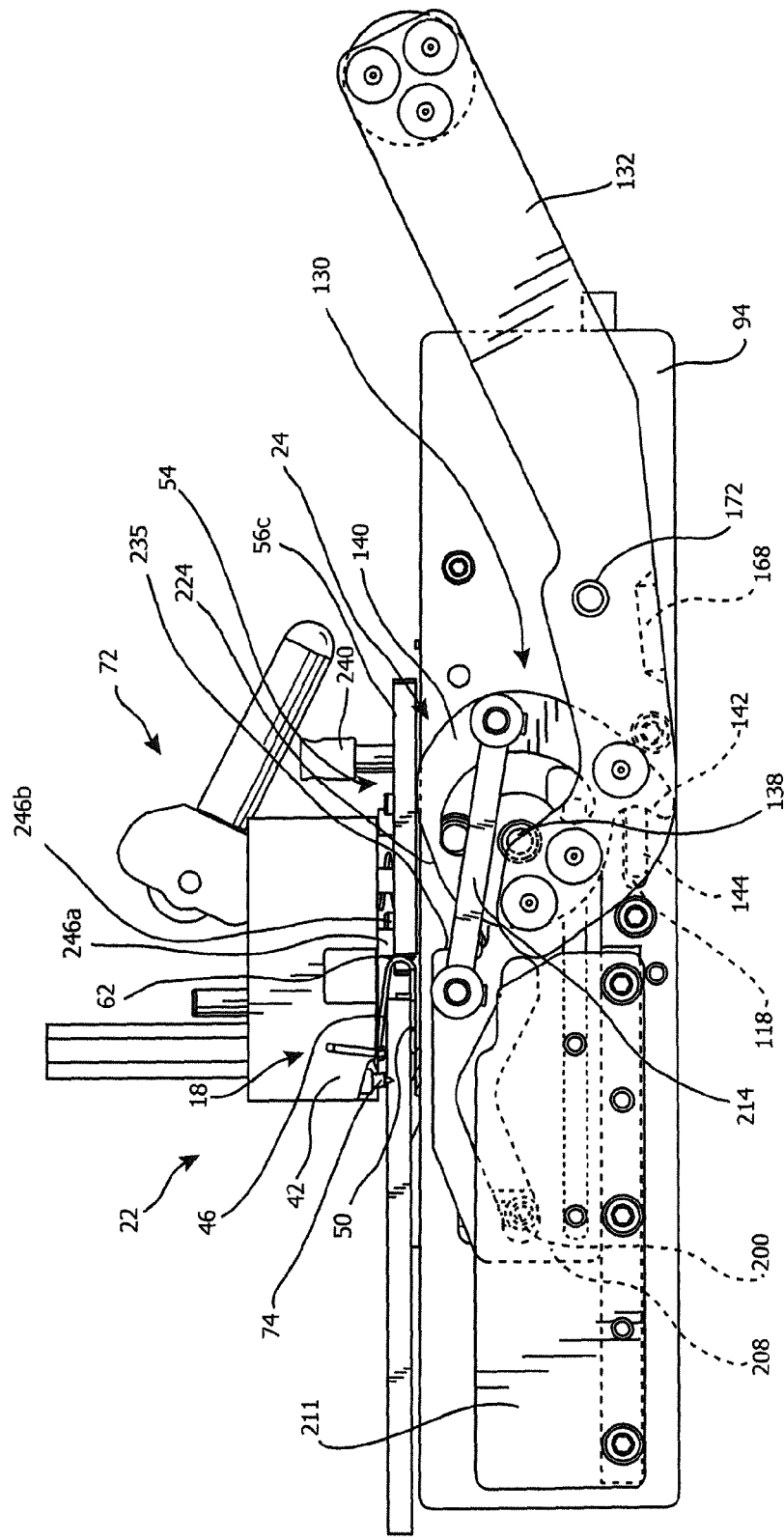
FIG. 2 is an elevational view of the apparatus of FIG. 1 with the handle in the initial set position and a side plate member of the handle and a guard plate in phantom to show a cam disc of a cam mechanism rotated to pull a cam plate rearwardly.

In FIGS. 1 and 2, an apparatus 10 for installing or applying belt fasteners 12 to a conveyor belt 14 along its end or end edge 16 via prestaked staples 18 of the fasteners 12 is illustrated. The belt fastener apparatus or tool 10 has an elongate base or base assembly 20 (FIG. 12) for the support and mounting of the various operating components thereof. More particularly, the base assembly 20 has a belt clamping and alignment mechanism 22, an actuating or cam mechanism 24, and a hold-down mechanism 26 mounted thereto. An actuator 28 is operable to be shifted between initial and final set positions for allowing the staples 18 of each of the fasteners 12 in the tool 10 to be initially set before any are finally set, and then, without having to remove the belt 14 from the tool 10, to proceed with final setting of each of the initially set fasteners 12 in the tool 10.

For this purpose, the illustrated tool 10 is operable to shift the belt 14 and anvil or anvil assembly 30 (FIG. 15) relative to each other in a fore-and-aft direction 32 corresponding to the lengthwise or longitudinal direction along the length of the conveyor belt 14 secured in the tool 10 by the belt clamping and alignment mechanism 22. With the actuator 28 in the initial set position, the anvil assembly 30, which can take the form of multiple anvils or anvil members 34, is oriented so that the initial set portions 36 are generally arranged to be aligned in a row along the length of the elongate base 20 orthogonal to the fore-and-aft direction 32 so as to be aligned with the staple legs 18a and 18b of each of the fasteners 12 in the tool 10.

In other words, the tool 10 is configured so that with the belt 14 secured in the tool 10, the elongate base 20 has its length oriented to extend laterally across the width of the belt 14. Thus, with the belt 14 supported on the base assembly 20 in the tool 10, the lengthwise dimension of the belt 14 is oriented to extend across the width of the base 20 orthogonal to the length thereof.

With the actuator 28 shifted to the final set position as shown in FIGS. 9-11, the belt 14 and the anvil assembly 30 are shifted relative to each other in the fore-and-aft direction 32 so that the final set portions 38 which, like the anvil initial set portions 36, are also generally arranged in a row along the length of the base 20, are now aligned with the initially set staple legs 18a and 18b for the final setting drive operations. The present tool 10 offers the operator significant convenience in not having to move the belt between different applicator tools for the initial and final set staple driving operations. Further, an operator can initially set the fasteners 12 in any order desired since there is no need to sequentially advance an indexing head down along the belt end 16 and the fasteners 12 thereon in the tool 10.

Figure 3:
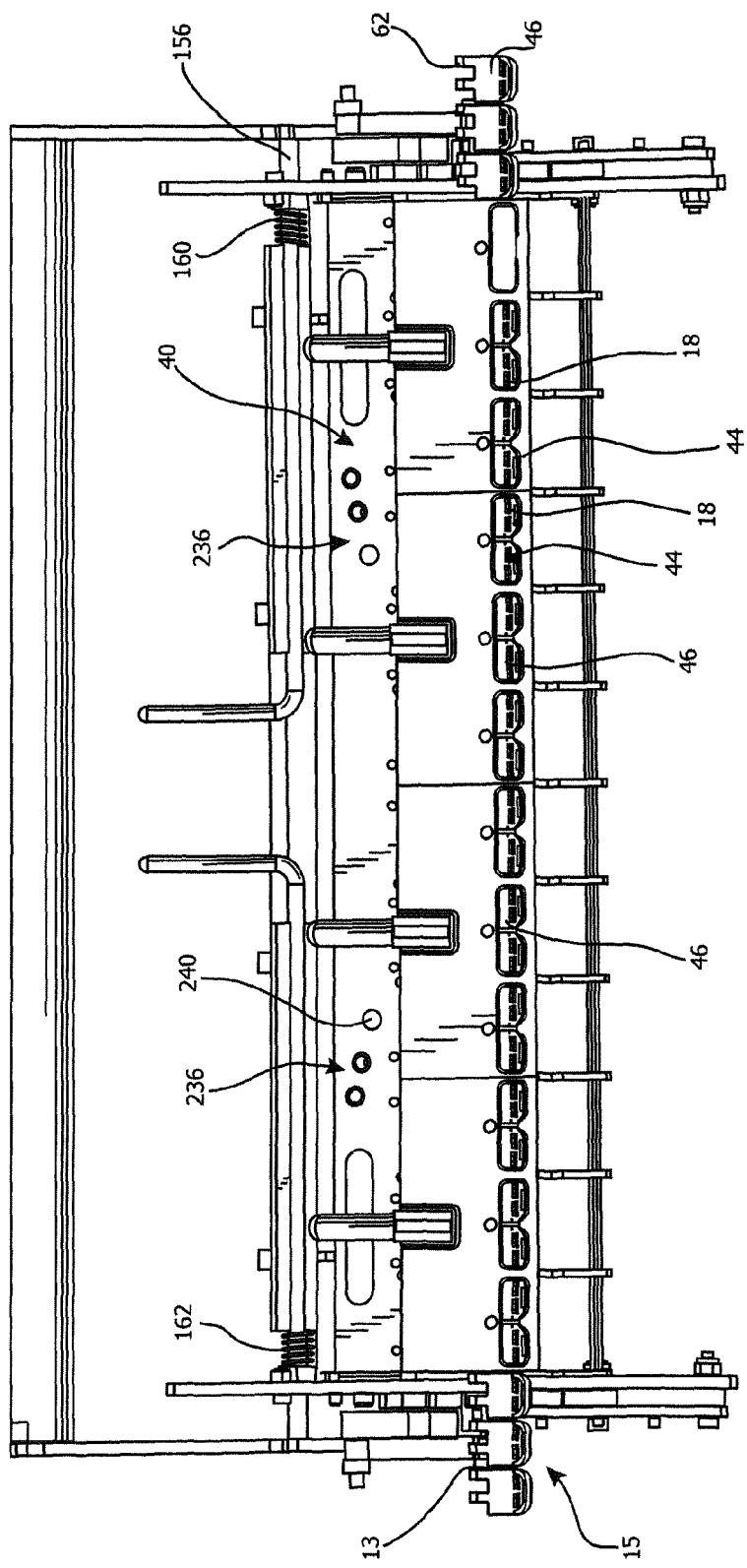
FIG. 3 is a plan view of the apparatus of FIG. 1 with the handle in the initial set position showing guide openings of guide blocks receiving the staples of the fasteners therein for being aligned over forward initial set portions of anvil members of an anvil assembly.

Instead, a splice installer can load the belt fasteners 12 on the belt end 16 into the tool 10 to be clamped therein in alignment with the anvil member 34, and specifically the initial set portions 36 thereof, via the belt clamping and alignment mechanism 22 by shifting of the actuator 28 to the initial set position. In this configuration, a guide device 40 in the form of guide blocks 42 of the belt clamping and alignment mechanism 22 has guide through openings 44 vertically aligned with the forward initial set portions 36 of the anvil members 34 with the staples 18 projecting up from upper plates 46 of the belt fasteners 12 to be received therein, as can be seen in FIG. 3. Referencing FIGS. 3 and 8, by way of example, four guide blocks 42 each having three guide openings 44 are mounted to the base 20 so as to extend for substantially the entire length thereof. Each of the guide openings 44 are shown as being sized to drive the staples 18 of a pair of fasteners 12. Since each of the illustrated fasteners 12 include a pair of staples 18 held or prestaked to the upper fastener plate 46, four prestaked staples 18 project into each guide opening 44.

Figure 5:
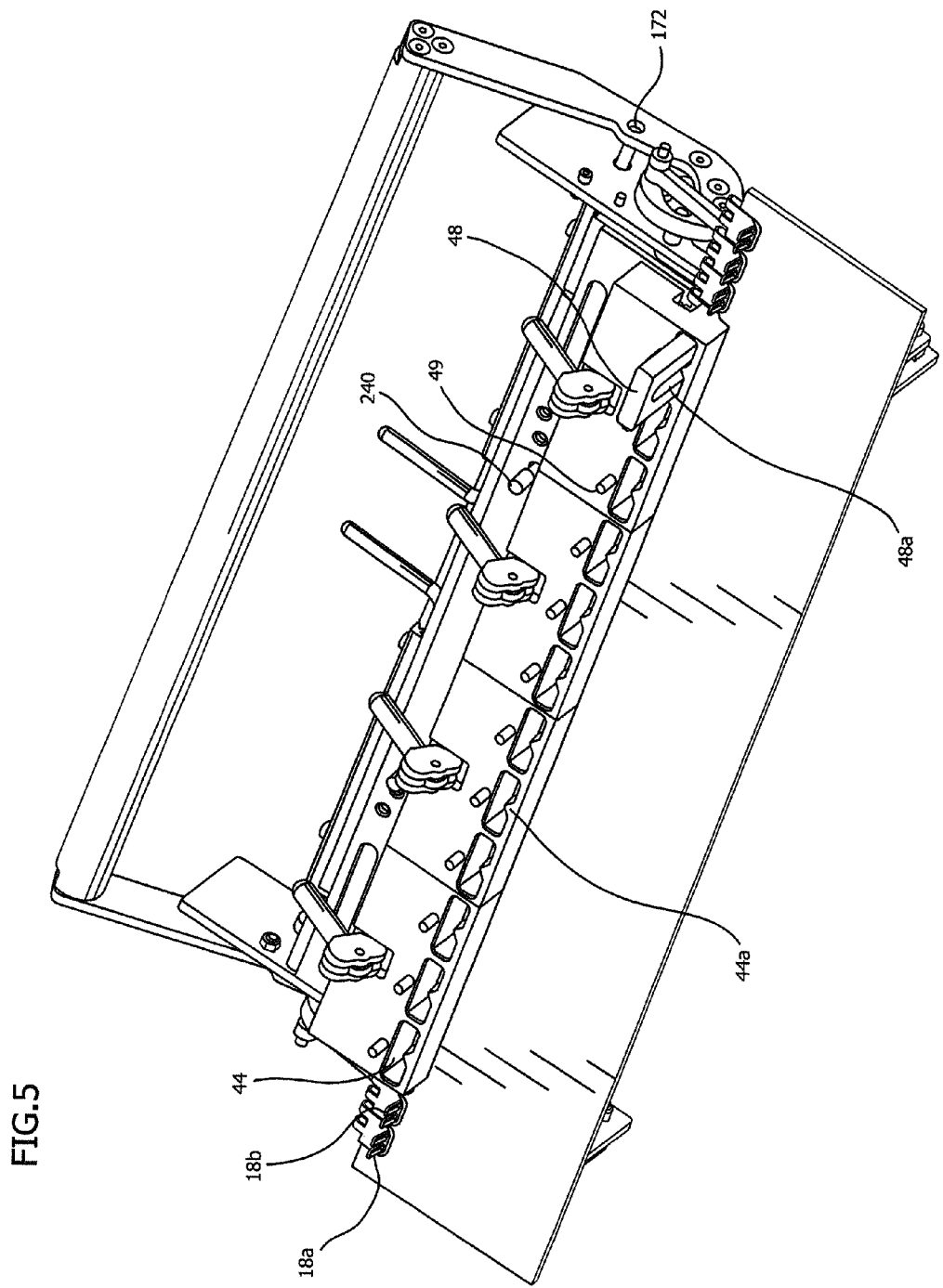
FIG. 5 is a perspective view of the belt fastener apparatus showing the configuration of a drive member from a power staple drive tool received by a mating fit in one of the guide openings.

At this time, the operator can use a separate power or motor driven staple drive tool 47 (FIGS. 21A-21C), such as disclosed in U.S. Pat. No. 7,568,269, with its drive member 48 configured to mate as by a keyed fit in the guide openings 44 as best seen in FIG. 5 for driving the staple legs 18a and 18b of the four staples 18 through the apertures in the upper plate 46, through the belt 14, through aligned apertures in the lower plate 50, and into specially configured recesses or wells 52 in the anvil members 34 for bending and initially setting the legs 18a and 18b. The drive member 48 has a central groove 48a on its front face, and the blocks 42 each have key projections 44a that extend into the through bores or openings 44. To insert the drive member 48 in one of the guide openings 44, an operator needs to orient the power drive tool 47 so that the groove 48a of the staple drive member 48 is aligned with the projection 44a so that it can be received in the groove 48a with the drive member 48 advanced into the guide opening 44.

Referring to FIGS. 21A-21C, the power staple drive tool for driving the drive member 48 in the guide openings 44 is shown as a pneumatic drive tool 47. The pneumatic drive tool 47 can be similar to the trigger-actuated, pneumatic staple drive tool disclosed in U.S. Pat. No. 7,568,269, incorporated by reference herein. The illustrated pneumatic drive tool 47 houses a pneumatic motor 47a supplied by a source of pressurized air via line 47b connected to the tool 47 at one end and having a fitting at its other end for being connected to a source of pressurized air. Manifestly, other types of power tools are contemplated for powered driving of the staple drive member 48 such as those driven by electric or hydraulic motors. As described in the '269 patent, the power tool 47 is in the form of a portable, hand-held gun having a trigger mechanism 47c that is only operable to advance the drive member 48 to impact the staples 18 when its safety 47d is actuated by one of the pin actuators 49 projecting upwardly from the guide blocks 42 adjacent to and slightly rearwardly from the guide block openings 44. The safety 47d of the pneumatic gun tool 47 is actuated to be shifted upwardly by one of the pin actuators 49 when the drive member 48 of the tool 47 is properly inserted in the guide opening 44 adjacent the pin actuator 49, as shown in FIG. 21B. At this time, an operator can pull the trigger 47c to pneumatically drive the drive member 48 downwardly in the guide opening 44 to impact the staples 18 aligned therewith for initially setting the staple legs 18a and 18b, or for final setting thereof as will be described hereinafter.

Referencing FIG. 15, as previously mentioned the anvil 30 can be formed of multiple anvil members 34. The anvil members 34 can each be associated with a corresponding one of the guide openings 44 so that the wells 52 of each anvil member 34 are arranged to initially set the legs 18a and 18b of four staples 18. In this regard, since there are twelve guide openings 44, twelve anvil members 34 are provided. Manifestly, the number of guide blocks 42 and anvil members 34 as well as their sizing with respect to the fasteners 12 and number of staples 18 can vary from that shown herein.

For properly aligning the fasteners 12 relative to the anvil members 34, the belt clamping and alignment mechanism 22 includes a fastener alignment device 54 in the form of comb plate 56, as best seen in FIG. 16. The comb plate 56 has finger projections 58 spaced along its forward edge to form a crenulated pattern with consistently spaced recesses 60 between the projections 58. As is known, the staple belt fasteners 12 have arcuate hinge loops 62 that interconnect the upper plate 46 to the lower plate 50 at rearward edges thereof, as can be seen in FIGS. 2 and 3. The arcuate hinge loops 62 are received between the projections 58 and pushed into engagement with the comb plate 56 in the recesses 60 thereof so as to properly align the fasteners 12, and in particular the staples 18 thereof, relative to the adjacent anvil members 34 forwardly thereof, and for fitting into the guide block through openings 44, as previously discussed. The comb plate 56 has a compact configuration with a relative low profile compared to prior comb alignment devices. By way of example, the thickness of the plate body 56a of the comb plate 56 between substantially flat upper surface 56c and substantially flat lower surface 56d thereof can be approximately 0.205 inch.

With the tool 10 in the initial set configuration and the belt 14 and fasteners 12 thereon received and clamped therein, the anvil assembly 30 acts in conjunction with the belt clamping and alignment mechanism 22 to clamp and securely hold the belt 14 and fasteners 12 during the power driving operation of the staples 18 for initial setting of the staple legs 18a and 18b. More particularly, both the guide blocks 42 of the guide device 40 and comb plate 56 of the fastener alignment device 54 are mounted to pivot mounting plate 64, as shown in FIG. 13. The comb plate 56 can be adjusted on the pivot mounting plate 64 for the size of the fastener to be installed on the belt end 16 without having to remove the guide blocks 42 and comb plate 56 from the tool 10, as will be discussed in more detail hereinafter.

Referencing FIGS. 14A, 14B and 16, the guide blocks 42 are fastened to the pivot mounting plate 64 via a clamp shaft 66 having a threaded end 67 that extends in clearance through an elongate opening 68 in the comb plate 56 to be threaded into a threaded aperture 70 in the pivot mounting plate 64. The guide blocks 42 each have an clamp device such as in the form of the illustrated over-center toggle clamp 72 pivotally connected to the clamp shaft 66 which when pivoted down to the illustrated clamped position urges spring loaded nails or pins 74 (FIG. 17) of the guide blocks 42 into the upper surface of the conveyor belt 14 for pushing the belt downward to bias the lower plates 50 of the belt fasteners 12 into tight engagement with the anvil members 34. However, this downward force creates an upward reaction force in the belt clamping and alignment mechanism 22. To maintain the mechanism 22 in tight engagement mounted on the base assembly 20 and specifically upper web portion 76 of elongate channel member 78 thereof, the hold down mechanism 26 is operable with the actuator 28 shifted to the initial set position. With the hold down mechanism 26 operable, the pivot mounting plate 64 is pulled tightly down toward the channel member web portion 76 to keep the mechanism 22 rigidly connected to the base 20 when the clamp devices 72 are shifted to their over-center clamped position as shown. In this regard, the guide blocks 42 each also include spring members 80 depending therefrom to be compressed against the comb plate 56 with the clamp devices 72 operable to urge the comb plate 56 tightly into engagement with the pivot mounting plate 64 so that it is secured during the initial setting operation of the staple legs 18a and 18b.

The anvil assembly 30 has the anvil members 34 secured to a slide mounting plate 82 at the forward end portion thereof in the fore-and-aft direction 32. In this regard, the mounting plate 82 includes a rear portion 83 that is exposed rearwardly from the anvil members 34 and which is fit between the pivot mounting plate 64 for the belt clamping and alignment mechanism 22 and the channel web portion 76. Thus, when the hold down mechanism 26 is operable, the anvil mounting plate 82 is clamped tightly between the mounting plate 64 and the channel web portion 76. This clamped arrangement of the anvil assembly 30 positions the anvil members 34 to be closely adjacent to and forwardly of the comb plate 56. Therefore, the belt 14 including the fasteners 12 thereon are firmly and securely held in the tool 10 in the initial set configuration thereof by the application of a clamping force from above via the spring loaded pins 74 urged into engagement with the belt to push the belt, including the lower belt fastener plates thereon down into tight engagement onto the anvil members 34 rigidly clamped to the base assembly 20 against upward shifting, as described above.

As previously discussed, the belt fastener applicator apparatus 10 herein utilizes a fore-and-aft shifting of the belt 14 and the anvils 34 relative to each other for positioning either the initial set portions 36 or final set portions 38 of the anvils 34 in vertical alignment with the guide block openings 44 and staple legs 18a and 18b depending on the driving operation that is to occur. In the illustrated tool 10, it is the anvil assembly 30 that is shifted in the fore-and-aft direction 32. For this purpose, the belt 14 including the belt fasteners 12 having the initially set staples 18 is lifted as by pivoting thereof. To do this, the belt clamping and alignment mechanism 22 is pivotally mounted to the base assembly 20 and is pivoted upwardly as the actuator 28, in the form of a manually operated handle 29 that is also pivotally mounted to the base assembly 20, is pivoted from the initial set position thereof toward its final set position. The handle 29 is connected to the cam actuating mechanism 24 so that the pivoting of the belt clamping and alignment mechanism 22 is caused by cam actuation, as will be described further hereinafter. Thus, the present tool 10 has two distinct configurations: an initial set configuration with the handle 29 in the initial set position to allow initial set driving operations to occur on all of the fasteners 12 in the tool 10 prior to any final setting operations for these fasteners 12, and a final set configuration with the handle 29 in the final set position to allow final set operations to occur on all of the fasteners 12 in the tool 10 after the initial setting operations have occurred for these fasteners 12.

To pivotally mount the belt clamping and alignment mechanism 22, the plate 64 has a rearwardly disposed pivot pin 84 that projects out from either side thereof, as shown in FIGS. 13 and 14. Referring to FIG. 12, the channel member 78 has a forward leg 86 and a rearward leg 88 depending from corresponding forward and rearward ends of the web portion 76 in the fore-and-aft direction 32. Mounting blocks 90 and 92 are fastened to the underside of the web portion 76 at either end thereof between the legs 86 and 88. Side frame plates 94 and 96 are secured to the mounting blocks 90 and 92 as by bolting thereto. The plates 94 and 96 include rearwardly disposed apertures 98 and 100 into which the projecting ends of the rear pivot pin 84 are pivotally received.

With the belt clamping and alignment mechanism 22 pivotal and the anvil assembly 30 being slidable in the fore-and-aft direction 32 which corresponds to a widthwise direction across the width of the elongate channel member web portion 76 orthogonal to its length, it is important for the mechanism 22 and the anvil assembly 30 to be securely held to the base assembly 20 so that proper alignment of the staple legs 18a and 18b with the initial set wells 52 of the anvil members 34 is maintained during the power driving operation with the power tool drive member or punch 48.

For this purpose, the hold down mechanism 26 is provided and includes a pair of shoulder bolts 102 secured to the underside of the pivot mounting plate 64, one of which is shown in FIG. 17. The shoulder bolts 102 each have an enlarged head 104 at their lower ends and carry a floating wedge member 106 on their shanks 108 supported against the head 104. The wedge 106 has a central opening sized so that the wedge 106 is loosely received on the shank 108 and is able to freely shift therealong when the hold down mechanism 26 is not operable. The wedge members 106 each have an inclined, wedge surface 110 that faces upwardly and is disposed toward the rear thereof in the fore-and-aft direction 32.

Figure 4:
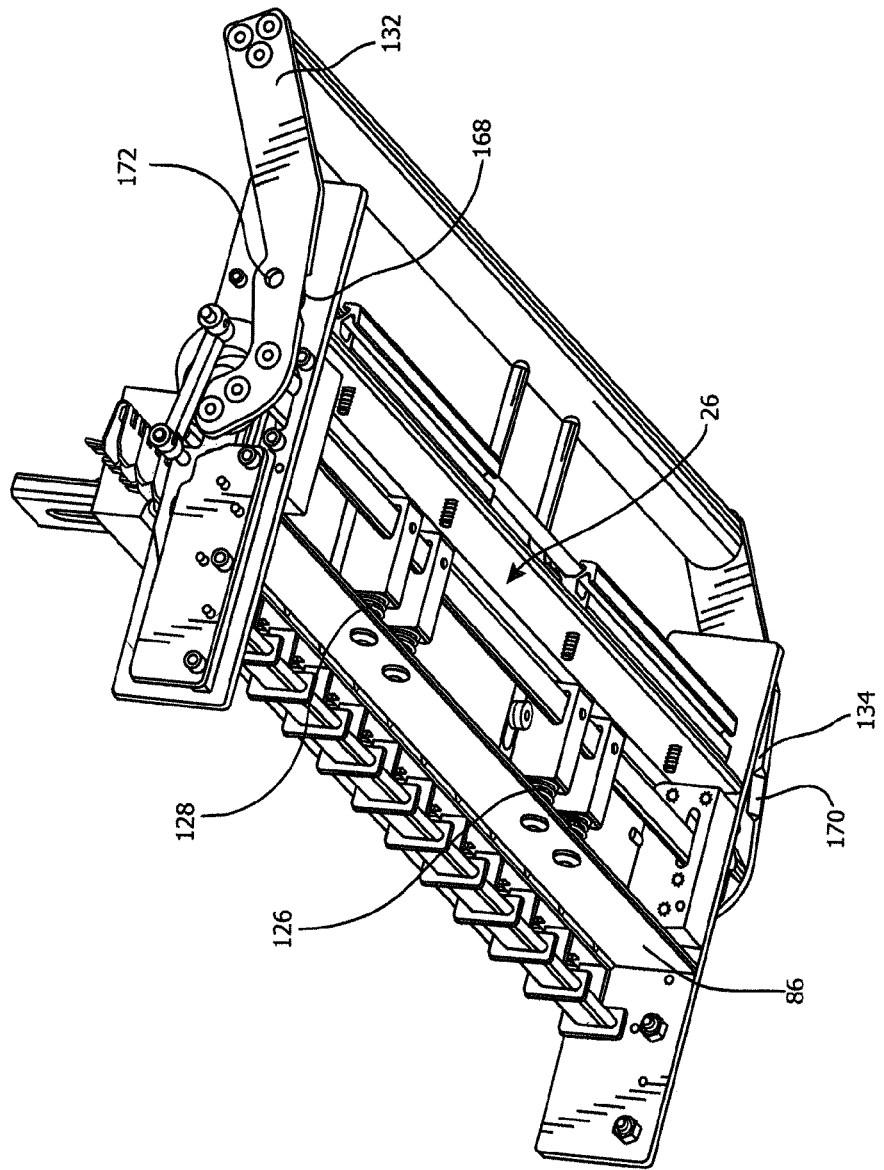
FIG. 4 is a bottom perspective view of the belt fastener apparatus showing the underside of a channel member of a base assembly and a hold down mechanism mounted to the base assembly operable to pull the guide blocks and comb plate downward toward the channel member with the handle in the locked, initial set position.

The hold down mechanism 26 further includes a cooperating wedge device 112 that has a mounting plate 113 with inclined wedge surfaces 114 thereon that are configured to cooperate with the wedge surfaces 110 of the wedge members 106 in the initial set configuration of the tool 10. Referring to FIGS. 11, 12, and 18, the wedge device 112 is mounted to the base assembly 20 via depending mounting bolts 115 threaded to and projecting down from the channel web portion 76. The bolts 115 are received through slots 117 of the wedge device plate 113 that are elongated in the fore-and-aft direction 32 with enlarged heads 115a of the bolts 115 slidingly engaged on the underside of the mounting plate 113 for slidingly supporting the plate 113 thereon An actuating beam 116 extends through oversized slots 118 and 120 formed to extend through the mounting blocks 90 and 92 and the corresponding side plates 94 and 96 to allow for fore-and-aft shifting therein by engagement with the cam mechanism 24, as will be described more fully hereinafter. The wedge device 112 has spring blocks 122 through which the actuating beam 116 extends with each having a spring pocket 124 at their forward ends. As can be seen in FIG. 4, springs 126 are received in the pockets 124 with their coils extending about a spring mounting post 128 fastened to the channel forward leg 86. Thus, the springs 126 are disposed between the inner surface of the legs 86 and the forward pockets 124 of the wedge device blocks 122 so that when compressed they bias the wedge device 112 rearwardly.

The wedge surfaces 114 are each located between an adjacent pair of spring blocks 122 and are spaced along the length of the plate 113 to correspond to the spacing of the wedge members 106 carried on the shoulder bolts 102 to be aligned therewith. The wedge members 106 have their wedge surfaces 110 arranged to be inclined to the horizontal to face upwardly and rearwardly while the wedge surfaces 114 have substantially the reverse configuration so that they are inclined to the horizontal to face downwardly and forwardly. In this manner, when the wedge surfaces 114 are shifted forwardly into camming engagement with the wedge surfaces 110, the wedge members 106 apply a downward force to the shoulder bolt heads 104 pulling the mounting plate 64 against the rear portion 83 of the anvil plate 82 thereunder, so as to clamp the anvil plate 82 tightly against the channel web portion 76.

For shifting the wedge device 112 forwardly to generate the downward pulling force on the plate 64 in the initial set configuration of the tool 10, the handle 29 is connected to a rotary cam disc 130 of the cam mechanism 24. It should be noted that the handle 29 has a bail configuration with side plate members 132 and 134 rigidly interconnected by a gripping bar 136 at outer ends of the plate members 132 and 134. At their other ends, both of the plate members 132 and 134 are connected to identical cam mechanisms 24 so that only one of the cam mechanisms 24 will be described in detail herein.

The rotary cam disc 130 is rotatably mounted to a bearing axle 138, as can be seen in FIGS. 2 and 12. The axle member 138 is captured between the mounting block 90 and channel web portion 76 in a recess formed in the upper surface of the mounting block 90 and extends through a corresponding opening in the side frame plate 94 of the base assembly 20. The cam disc 130 has an outer surface 140 that includes a shoulder surface portion 142. The actuator handle 29, and specifically the side plate member 132 thereof is attached to the rotary cam disc 130 so that pivoting the handle 29 causes the rotary cam disc 130 to rotate about the axle member 138. Further, the handle side plate member 132 is fixed to the rotary disc 130 such that when the handle 29 is pivoted to the initial set position as shown in FIG. 2, the shoulder surface 142 will push the end 144 of the wedge device beam 116 projecting out of the slot 118 forwardly therein against the spring bias provided by the springs 126. This forward shifting of the wedge device 112 causes its wedge surfaces 114 to cammingly engage the corresponding wedge surfaces 110 of the wedge members 106 pushing the wedge members 106 downwardly which causes the shoulder bolts 102 to pull the attached mounting plate 64 downward toward the channel web portion 76 to clamp the anvil plate 82 therebetween, as previously discussed.

A handle lock mechanism 146 is mounted to the base assembly 20 and is operable to lock the actuator handle 29 in the initial set position thereof, as shown in FIGS. 1-5. In this manner, the shoulder 142 of the rotary cam disc 130 is locked in position to keep the actuating beam 116 of the wedge device 112 from shifting rearwardly under the influence of the bias force provided by the compressed springs 126 which would otherwise disengage the wedge surfaces 110 and 114 from each other. Thus, the handle lock mechanism 146 permits the operator to release the handle 29 for performing the initial set operation with the belt 14 and the fasteners 12 thereon remaining tightly clamped in the tool 10 as previously described.

As illustrated, the handle lock mechanism includes a pair of handle lock rods 148 and 150 that are mounted for sliding in channels of corresponding elongate extrusion members 152 and 154 fastened to the rear leg 88 of the channel member 78, as shown in FIG. 12. The extrusion members 152 and 154 are spaced from the corresponding side frame plate members 94 and 96 so that the lock rods 148 and 150 extend out from the extrusion members 152 and 154 through this spacing and through corresponding openings formed in the side frame plate members 94 and 96. The lock rods 148 and 150 are biased outwardly so that respective ends 156 and 158 extend through the side frame plate openings in clearance therewith to project beyond the side frame plates 94 and 96 to be engaged by the actuator handle 29, and specifically the side plate members 132 and 134 thereof. Referring to FIGS. 3 and 12, the lock rods 148 and 150 are biased away from each other by springs 160 and 162 mounted on the rods 148 and 150 between the extrusion members 152 and 154 at outer ends thereof adjacent the corresponding side frame plates 94 and 96 and stops in the form of collars 164 and 166 fixed on the rods 148 and 150 between the outer ends of the extrusion members 152 and 154 and the corresponding side frame plates 94 and 96.

The handle side plate members 132 and 134 are of identical struture for camming and retaining the corresponding rod ends 156 and 158. Each of the handle members 132 and 134 include a cam surface 168 and 170, respectively, formed on the inner surface thereof facing the corresponding frame side plates 94 and 96. These cam surfaces 168 and 170 are formed at the lower edge of the handle members 132 and 134, are inclined to the vertical, and are positioned along the length of the elongate handle members 132 and 134 so that they engage the projecting rod ends 156 and 158 when the handle actuator 29 is pivoted downwardly toward the initial set position thereof.

As the handle actuator 29 is pivoted toward the initial set position, the cam surfaces 168 and 170 engage the corresponding rod ends 156 and 158 pushing the lock rods 148 and 150 inwardly toward each other against the spring bias provided by springs 160 and 162 so as to compress the springs between the stop collars 164 and 166 and the outer ends of the extrusion members 152 and 154. The handle members 132 and 134 are each provided with an aperture for receiving the rod ends 156 and 158 therein, with only rod receiving aperture 172 of handle side plate member 132 illustrated herein. As shown, the aperture 172 is above the cam surface 168 to be positioned such that the rod end 156 will engage against the cam surface 168 for being shifted inwardly against its spring bias, ride against the inner surface of the side plate member 132, and then snap into the aperture 172 due to the spring bias as the handle actuator 29 is pivoted to the initial set position. In this manner, the handle actuator 29 is locked in the initial set position against pivoting upwardly away therefrom maintaining the rotary disc shoulder 142 in position to keep the actuating beam 116 from shifting rearwardly, as has previously been described.

With the handle 29 locked in the initial set position, an operator can use the power staple driver, such as the previously described pneumatic drive tool 47 having the pneumatically powered motor 47a that is actuated to drive the punch member 48 to impact against the staples 18 received in the guide block openings 44 for initially setting the staple legs 18a and 18b. For this operation, it may be desirable to drive the staples 18 at either end of the tool 10, and then to drive the staples at the center of the tool 10, and finally to drive the remaining staples between the ends and the center. This pattern of staple setting has been found to be advantageous to avoid any problems that could occur if the staples 18 were instead driven sequentially from one end of the tool 10 to the other. In this instance, the material of the belt may have a tendency to progressively grow from one side of the belt end 16 to the other which can create ripples or deformation in the belt end 16 as the belt material gets compressed and squeezed from one fastener 12 where the plates 46 and 50 thereof have been closed onto the belt end 16 to the next where the fastener plates 46 and 50 remain open.

After setting of all the staples 18 in the tool 10 is complete, the handle lock mechanism 146 is released. To do this, the handle lock rods 148 and 150 are each provided with an end gripping portion 174 and 176 that extend rearwardly at right angles to the remainder of the respective lock rods 148 and 150, as best seen in FIG. 12. To release the handle lock mechanism 146, an operator engages the gripping portions 174 and 176 and squeezes them toward each other against their spring bias pulling the rod ends 156 and 158 out from the apertures of the handle plate members 132 and 134. However, once the rod ends 156 and 158 have cleared their respective handle apertures, the spring force on the wedge device 112 generated by compressed springs 126 thereof will immediately cause the actuating beam 116 to shift rearwardly in the slots 118 and 120 to cause the rotary disc 130 to rotate in a counterclockwise direction as viewed in FIG. 2. This rotation of the cam disc 130, in turn, causes an upward pivoting of the handle 29 away from the initial set position so that the operator has visual feedback that the handle lock mechanism 146 has been released. This upward shifting will be sufficient so that the lock rod gripping portions 174 and 176 can be released to allow the rod ends 156 and 158 in the openings in the side frame plates 94 and 96 to be urged further outwardly therefrom without encountering interference from the handle side plate members 132 and 134.

Figure 6:
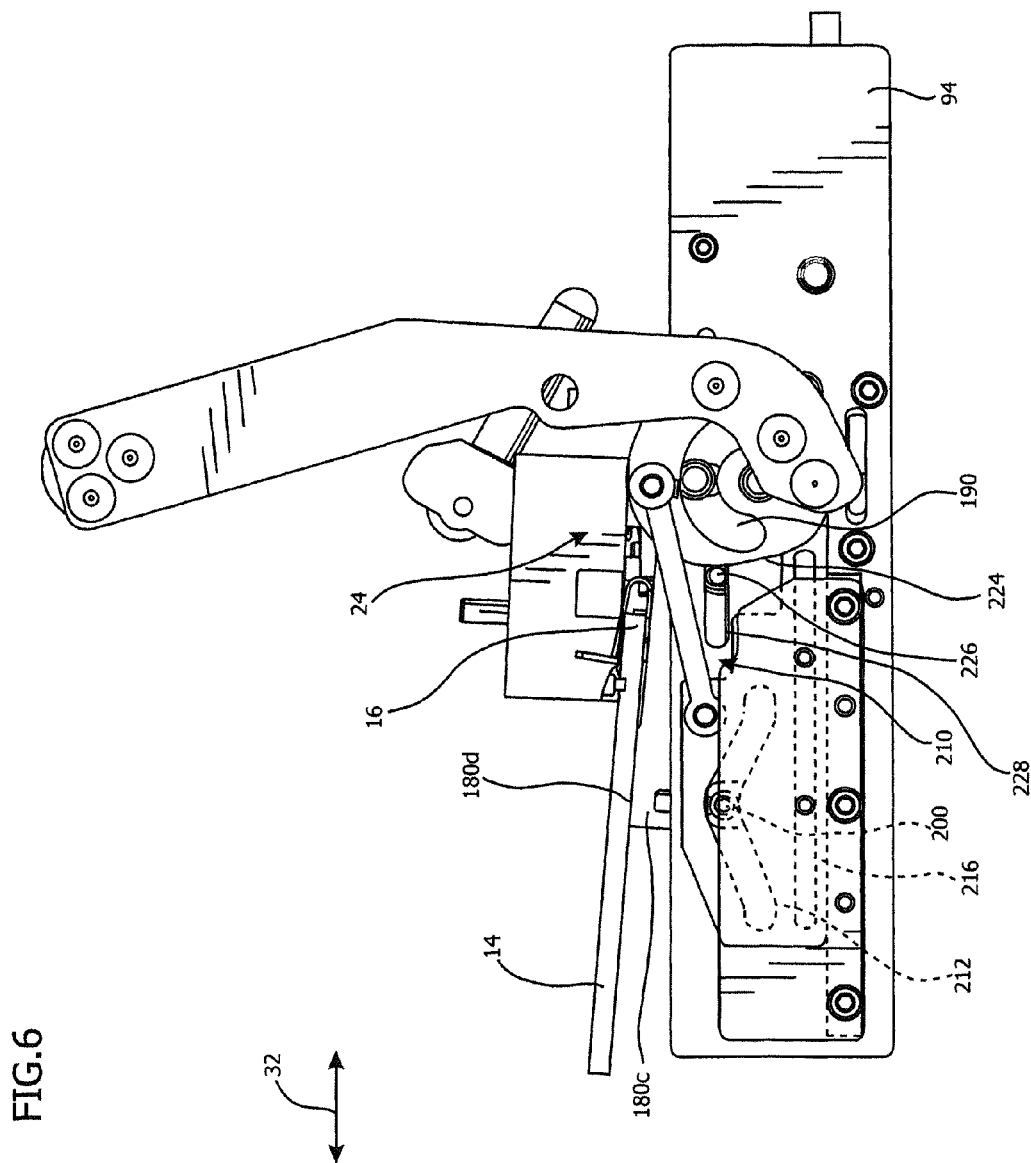
FIG. 6 is an elevational view of the belt fastener apparatus with the guard plate in phantom and showing the handle pivoted forwardly to an intermediate position between the initial set position and a final set position to rotate the cam disk to push the cam plate forwardly causing lift members to raise the clamped conveyor belt.
Figure 7:
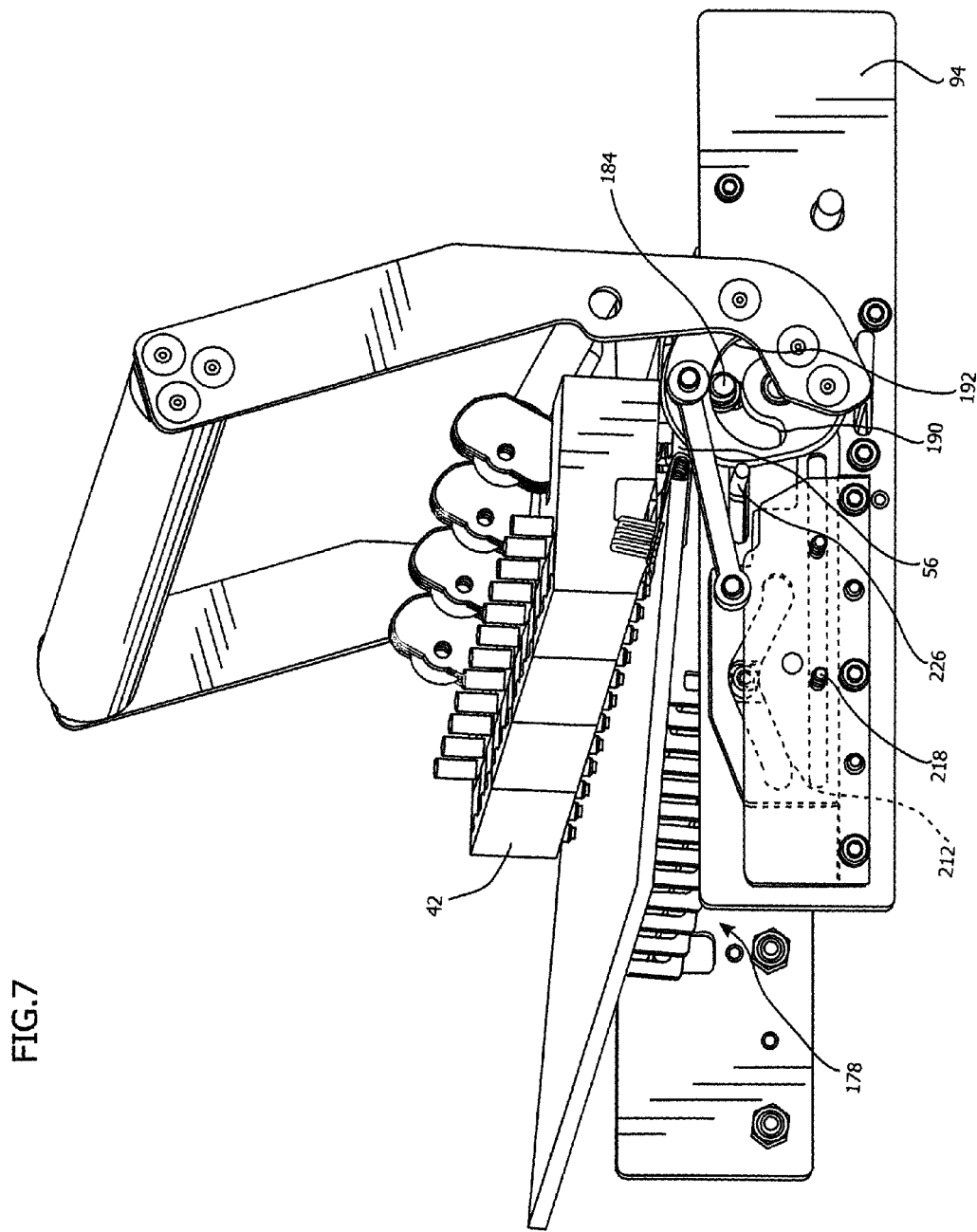
FIG. 7 is a perspective view of the belt fastener apparatus of FIG. 6.
Figure 8:
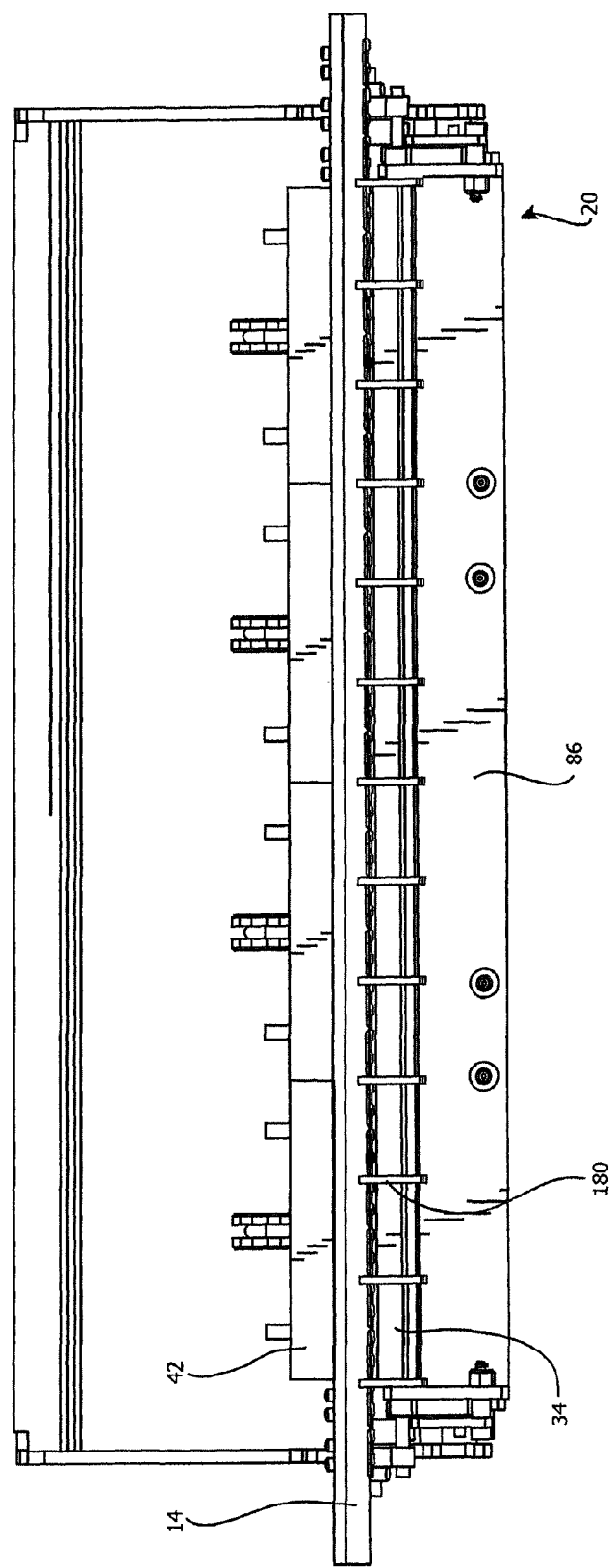
FIG. 8 is an end elevational view of the belt fastener applicator apparatus showing the belt lift members engaged with the underside of the belt for lifting the initially set staple legs to clear the anvil members therebelow.

The operator can then pivot the handle actuator 29 forwardly to the final set position by gripping the grip bar 136 and pushing it forwardly. As this pivoting of the handle 29 occurs, the belt clamping and alignment mechanism 22 is pivoted upwardly about rear pivot pin 84 thereof. However, because the hold down mechanism 26 is no longer operable and the anvil members 34 are no longer engaged with the lower fastener plates 50 under the belt end 16, the belt 14 and fasteners 12 thereon are no longer tightly clamped to the base assembly 20. Instead, during the pivoting of the mechanism 22 and the belt 14 held thereby, a lift mechanism 178 (FIG. 19) is operated to support the belt 14 on its underside so that the belt 14 is clamped between the guide blocks 42 and specifically the guide block pins 74 thereof and lift members 180 of the belt lift mechanism 178, as can be seen in FIGS. 6-8. The belt clamping and alignment mechanism 22 including the belt lift mechanism 178 while operable to continue clamping the belt 14 during pivoting do not receive clamping support from the rigid structure of the base assembly 20 and particularly the elongate channel 78 thereof since the belt 14 is lifted away therefrom and the hold down mechanism 26 is no longer operable as previously mentioned.

The pivot mounting plate 64 has a forwardly disposed retention rod 182 extending therethough beyond either end thereof so that rod ends 184, one of which is shown in FIGS. 14 and 17, project through respective vertically elongated openings 186 and 188 in respective side frame plates 94 and 96. Further, referencing only the illustrated rod end 184, the cam disc 130 includes an internal arcuate channel 190 into which the rod end 184 is received. As can be seen in FIGS. 6 and 7, the radially outermost surface 192 of the channel 190 is engaged with the rod end 184 so as to provide resistance to upward shifting of the belt clamping and alignment mechanism 22 due to the clamping action on the belt 14 forwardly therefrom by the guide block pins 74 and the belt lift members 180. The arcuate channel or slot 190 is configured to allow the rod 182 to shift vertically up and down in the frame openings 186 and 188 therefore due to the pivoting action of the mechanism 22. However, at all times the channel surface 192 is positioned to be engaged with the rod end 184 to provide support for the clamping action on the belt 14 as described above.

Referring to FIG. 19, the belt lift members 180 can be in the form of plate members that are elongated in the fore-and-aft direction 32 and which each have a forward, vertically extending slot 194 for receiving a cam follower rod 196 extending through each of the slots 194 and beyond either end lift member 180, and a connecting beam 198 that extends through each of the slots 194 above the follower rod 196. With the follower rod 196 extending beyond the end belt lift members 180, there are cam follower portions 200 and 202 projecting from either end of the belt lift mechanism 178. The side frame plates 94 and 96 include respective forward, vertically elongated openings 204 and 206 through which the corresponding cam follower portions 200 and 202 extend.

Referring to FIGS. 2 and 6, the cam mechanism 24 includes a forward cam plate 208 that is connected to the rotary cam disc 130 by pivot linkage mechanism 210. A guard plate 211 mounted to the side frame plate 94 extends over the majority of the cam plate. The cam plate 208 has an internal cam channel 212 which receives the cam follower portion 200 therein. The pivot linkage mechanism 210 includes an elongate link member 214 that has pivot connections at its rearward end to the cam disc 130 and at its forward end to the cam plate 208 so that rotation of the cam disc 130 causes translation of the cam plate 208 in the fore-and-aft direction 32. For this purpose, the cam plate also has a lower guide channel 216 that extends linearly adjacent the bottom of the cam plate 208 in the fore-and-aft direction 32. The guide channel 216 receives guide pins 218 therein that are secured to the side frame plate 92 for guiding the translation of the cam plate 208 in the fore-and-aft direction 32.

To provide the tool 10 with a desirable compact configuration, the profile thereof is kept to a minimum. For this purpose, the height of the base or base assembly 10 including the channel member 78 and side frame plates 94 and 96 are kept to a minimum. The channel member legs 86 and 88 have their bottoms aligned with the bottom edges of the plates 94 and 96 for engaging a support surface when the tool 10 is placed thereon with the height of the plates 94 and 96 being only slightly greater than the channel member 78. For example, the vertical height of the plates 94 and 96 from their bottom edge to their top edge can be approximately 2.4 inches.

The cam mechanism 24 including the cam disc 130, cam plate 208, and pivot linkage mechanism 210 also are provided with a compact arrangement to be mounted to the respective side frame plates 94 and 96. In this regard, since the base assembly 20 including the channel member 78 and the side plates 94 and 96 are typically placed on an elevated support surface such as a work table top, the tool 10 herein has the cam mechanism 24 configured so that no portion of the moving components thereof can project below the bottom of the plates 94 and 96. Similarly, when the handle 29 is in the rearward initial set position, no portion thereof will project below the lower edges of the base side plates 94 and 96, as can be best seen in FIG. 2.

When a conveyor belt 14 is inserted in the tool 10, the belt 14 can extend beyond the side frame plates 94 and 96 at either end of the tool base 20, particularly with larger width belts 14. In this instance, the belt 14 will extend closely adjacent to and above the upper edges of the respective side frame plates 94 and 96. To avoid potential interference between the belt 14 and the cam mechanism 24, the cam mechanism 24 of the tool 10 is arranged and configured so that no portions thereof project significantly beyond the upper edges of the base side plates 94 and 96 such that they would be engaged by the belt 14. In particular, only the rotary cam discs 130 have portions that project beyond the upper edges of the side plates 94 and 96. However, because of the discs 130 are generally arranged rearwardly from the belt 14 when it is inserted as the tool 10, the discs 130 will not engage the lateral portions of the belt 14 extending beyond the base side plates 94 and 96.

Referencing FIGS. 2, 6 and 7, it can be seen that pivoting the handle actuator 29 from the initial set position (FIG. 2) forwardly to an intermediate position (FIGS. 6 and 7) causes rotation of the rotary cam disc 130 in the counterclockwise direction which pushes the cam plate 208 forwardly via the link member 214 pivotally connected therebetween. The cam channel 212 has an inverted V-shaped configuration so that in the initial set configuration of the tool 10, the cam follower portion 200 resides at a lower, forward end of the cam channel 212 such that the belt lift members 180 are in their lowered position. In this regard, the belt lift members 180 each have a rear aperture 219 for receiving the retention rod 182 of the belt clamping and alignment mechanism 22 therethough for being pivotally mounted thereon. For this purpose, the pivot mounting plate 64 has forwardly opening slots 220 for receiving rear portions 180a of the lift members 180 therein to be pivotally mounted on the rod 182 extending therethough, as can be seen in FIG. 20. The belt lift members 180 have their lower height rear portions 180a extending forwardly along the anvil plate rear portion 83 and into the gaps 222 between the spaced anvil members 34 aligned with corresponding mounting plate slots 220 so that the slotted higher, forward portions 180c of the lift members 180 are disposed forwardly of the anvil members 34. Thus, in the lowered position of the belt lift members 180, the upper edge surface 180b of each of the rear portions 180a of the lift members 180 resides flush or below the upper surface of the anvil members 34 including the initial and final set portions 36 and 38 thereof to allow for proper driving of the staples 18 for initial setting of the staple legs 18a and 18b.

Once all of the staples 18 in the tool 10 have their staple legs 18a and 18b initially set, and the handle lock mechanism 146 is released as previously described, the handle actuator 29 can be pivoted to an intermediate position as shown in FIGS. 6-8 where the cam plate 208 is pushed forwardly causing the cam follower portion 200 to be shifted upwardly to the peak of the cam channel 212. This causes the belt lift members 180 to pivot upwardly into engagement with the underside of the belt 14 along the higher forward edge surface portions 180d of the forward portions 180c thereof, as shown in FIG. 6. Referring to FIG. 8, this lifting action of the belt 14 lifts the fastener lower plates 50 off the anvil members 34 and the initially set staple legs 18a and 18b out of the forwardly disposed wells 52 of the anvil initial set portions 36. Since the belt 14 remains clamped between the guide block pins 74 and the lift members 180, the belt lifting will also cause the guide blocks 42 and attached mounting plate 64 to pivot upwardly, along with the comb plate 56 therebetween. In addition, rear portion upper edge surfaces 180b of the lift members 180 will engage under the comb plate 56 pivoting it upwardly along with the belt 14 and initially set fasteners 12 thereon and the guide blocks 42 and mounting plate 64 secured thereto, as described above.

During the upward pivoting of the belt clamping and alignment mechanism 22 and lifting of the belt fasteners 12 including the initially set staple legs 18a and 18b projecting though the apertures of the fastener plate 46 and 50 and the belt end 16 therebetween, the anvil assembly 30 remains stationary. In this regard, it can be seen that that the outer surface 140 of the rotary cam disc 130 has a flat, dwell surface portion 224 that remains adjacent to and in clearance with an actuator pin 226 of the anvil assembly 30 during rotation of the cam disc 130 as the handle 24 is pivoted from the rearward initial set position to an intermediate belt lift position shown in FIGS. 6-8. The anvil actuator pin 226 extends through a fore-and-aft elongated opening 228 in the side frame plate 94. Since identical cam mechanisms 24 are provided on each side of the tool 10, an identical actuator pin 230 is provided on the other side of the anvil assembly 30 and an identical fore-and-aft opening 232 is provided in the side frame plate 96, as shown in FIGS. 12 and 15.

Once the belt lift members 180 have been pivoted up to their highest position so that the free ends of the staple legs 18a and 18b clear the anvil members 34 as shown in FIGS. 6-8, continued forward pivoting of the handle 29 toward its forward, final set position will cause rotation of the cam disc 130 so that curved cam surface portion 234 of the cam disc outer surface 140 engages the actuator pin 226. This camming engagement pushes the pin 226 forwardly in the guide opening 228 which, in turn, slides the anvil assembly 30 forwardly with the slide mounting plate 82 thereof sliding forwardly on the channel web portion 76 until the final set portions 38 of the anvils 34 are aligned with the guide block openings 44 and initially set staple legs 18a and 18b above the anvils 34.

This rotation of the cam disc 130 also causes the cam plate 208 to be pushed forwardly until the cam follower 200 reaches the rear, bottom end of the cam channel 212, as shown in FIG. 9. In this final set configuration of the tool 10 with the handle 29 pivoted forwardly to its final set position, the belt lift members 180 will again be in their lowered positions so that the rearward edge surface portions 180b thereof are flush or below the upper surface of the anvil members 34, and particularly, the substantially flat surface of the final set portion 38 of the upper surfaces of the anvil members 34. In this regard, the lowering of the belt 14 will cause the initially set staple legs 18a and 18b projecting through the belt 14 and the bottom fastener plate 50 to be engaged and supported on the anvil final set portions 38, as shown in FIGS. 9 and 10.

In the final set position, the handle side members 132 and 134 project forwardly and upwardly from their rigid connection to the cam discs 130 so that they extend forwardly along and above the belt 14 in the tool 10 with the handle gripping bar 136 extending across and above the belt 14, as shown in FIGS. 9 and 11. In this manner, the handle 29 can be shifted to the final set position without interference from the belt 14.

Since the anvil assembly 30 is not clamped tightly to the channel member 78 because the hold down mechanism 26 is not operable as can be seen in FIG. 11 with its actuating beam 116 biased to be shifted rearwardly in the slots 118 and 120 in which its ends are received, the belt 14 and fasteners 12 thereon are no longer tightly clamped in the tool 10. In this arrangement, the belt clamping and alignment mechanism 22 is no longer rigidly held to the tool base 20 since the hold down mechanism 26 is not pulling the mounting plate 64 down tightly toward the channel web portion 76 for being substantially rigidly connected thereto. Instead, the mounting plate 64 now is only supported by the channel member 76, with the anvil plate portion 83 under the mounting plate 64 but no longer tightly clamped between the mounting plate 64 and channel web portion 76.

Thus, in the final set configuration of the tool 10, the guide block pins 74 push down on the belt 14 from above, the staple legs 18a and 18b are supported on the anvil members 34 that are, in turn, only supported but not clamped on the channel web portion 76, and the end 184 of the retention rod 182 is engaged against the channel surface 192 of the cam disc 130 to resist upward shifting of the belt clamping and alignment mechanism 22 for retaining the mechanism 22 on the base 20. In this manner, the belt 14 and initially set fasteners 12 thereon are not clamped down onto the rigid channel member 78 of the base assembly 20. This provides a looser holding arrangement of the conveyor belt 14 so that it is retained but not tightly clamped in the tool 10 which is advantageous for the final setting of the initially set staple legs 18a and 18b. One reason for this is that with the protruding initially set staple legs 18a and 18b supported on the anvil final set portions 38, the fastener plates 46 and 50 are at an upwardly directed oblique angle to the horizontal, as can be seen in FIGS. 9 and 10. Thus, the fasteners 12 including the staple legs 18a and 18b thereof that are offset for extending crosswise to each other when finally set are not at an ideal orientation to be driven for the final setting operation.

Another consideration is that as a belt fastener 12 is driven to be finally set, the adjacent initially set belt fastener 12 with the lower plate 50 thereof angled upwardly from the anvil member 34 therebelow will actually resist the downward driving of the staple legs 18a and 18b of the adjacent fastener 12 since the adjacent fasteners 12 are interconnected by a bridge portion 13 between their lower plates 50 for being connected in a strip 15. However, because the belt 14 and fasteners 12 are only loosely held in the tool 10, the flexibility provided by the thin metal bridge portions 13 and the belt material itself can be utilized to allow the final setting of the staple legs 18a and 18b to occur with lower drive forces without causing damage to the belt 14 or the fasteners 12 due to the resiliency of the material of the conveyor belt 14 and the thin metal bridge portions of the belt fasteners 12. By contrast, if the belt 14 and belt fasteners 12 were tightly clamped in the tool for the final setting operation, the drive forces to finally set the initially set staple legs 18a and 18b would need to be larger to overcome the rigidly held belt 14 and fastener plates 46 and 50 of the adjacent belt fastener 12.

In other words, while one of the initially set fasteners 12 is raised from the underlying anvil member 34 by the bent staple legs 18a and 18b supported thereon, the power drive tool would be attempting to drive the adjacent fastener 12 downwardly onto the underlying anvil member 34 while the belt 14 and both fasteners 12 are still rigidly clamped in the tool. As is apparent, this would require much higher driving forces to overcome the tool clamping force which could potentially damage tool components, the belt 14, and the fasteners 12, and in particular the bridge portions 13 thereof. Moreover, it is more likely that the final set of the staple legs 18a and 18b will not be of the same high quality as obtained with the tool 10 herein which can lead to damage to the splice and lower splice life as well as causing damage to conveyor components that engage the splice fasteners. By contrast, with the looser hold of the belt 14 and the initially set fasteners 12 provided in the tool 10 herein, the drive forces for the final setting operation can be lower reducing stress on the tool 10 as well as on the belt 14 and fasteners 12 since the belt fastener bridges 13 and belt material can resiliently deflect and return to their non-deflected configuration for the final setting of the next adjacent fastener 12.

In this manner, the present tool 10 is able to undertake both the initial set and final set operations without requiring that the operator loosen the clamp devices 72 or otherwise adjust the guide blocks 42 to accommodate the higher sitting fasteners 12 due to initially set staple legs 18a and 18b projecting downwardly from the lower plates 50 of the fasteners 12. In the prior RS applicator system the separate initial and final set tools allowed the guide blocks of the separate tools to be calibrated so that they did not travel as far downward in the final set tool when the clamps were tightened as in the initial set tool. However, this required two separate tools and the time required to unclamp and remove the belt and the initially set fasteners from the initial set tool and to align, insert and reclamp the belt and initially set fasteners thereon in the final set tool.

By contrast, not only does the present tool 10 perform both initial and final set operations, it does so while the clamp devices 72 remain tightened in their clamped positions. However, once the actuator 28 is shifted to the final set position, the clamping force is reduced to a holding force since the belt clamping and alignment mechanism 22 is not rigidly held to the base 20 and the lift members 180 of the belt lifting mechanism 178 do not engage and support the underside of the conveyor belt 14. This introduces play into the holding of the belt 14 and initially set fasteners 12 thereon which allows for the final setting operation to occur on each of the initially set fasteners 12 without the potential of overstressing the belt 14 and fasteners 12, and particularly the interconnecting bridge portions 13 thereof, as well as the components of the tool 10. In addition, because the surface of the final set portions 38 of the anvil members 34 is substantially flat and the protruding staple legs 18a and 18b are supported on these flat anvil surfaces in the final set configuration of the tool 10, the need for precision alignment is not as great as in the initial set configuration of the tool 10, where the staple legs 18a and 18b have not yet been driven through the belt 14 and have to be precisely driven through apertures of the fastener lower plate 50 and into recessed wells 52 in the anvil initial set portions 36 after having been driven through the belt 14. Thus, the loose holding of the belt 14 and initially set fasteners 12 provides advantages without detracting from the quality of the final set of the staple legs 18a and 18b so that they are driven by operation of the power staple driver 47 to extend crosswise to each other generally at right angles to the vertical portions of the legs extending through the belt 14 so that they reside in a pocket of the fastener lower plate 50 so as not to protrude therefrom.

After final setting of all of the fasteners 12 in the tool 10 with the power staple driver, the actuator handle 29 is pivoted back from the final set position to the initial set position where the handle 29 is locked by the camming engagement between the handle 29 and the handle lock rods 148 and 150 for fitting into corresponding handle apertures 172, as previously described. In addition and referencing FIG. 2, the rotation of the handle 29 generates clockwise rotation of the rotary cam disc 130 pulling the cam plate 208 rearwardly so that a vertical shoulder surface 235 thereof engages the anvil pin 226 and pushes it rearwardly to shift the anvil members 34 back so that their initial set portions 36 are in alignment with the guide block openings 44 for initial setting drive operations. At this time, the clamp devices 72 are released and the belt 14 is removed from the tool 10 with the finally set fasteners 12 thereon. This entire process takes a little over a minute which represents a significant time savings over that required when using prior staple belt fastener installation systems.

Another advantageous feature of the tool 10 herein is the ability to adjust the fastener alignment device 54 without having to disassemble the tool 10 such as required in prior tools where the guide blocks had to be unfastened from the tool and the comb members had to be taken off of the tool and reoriented for use with a fastener of a different size. Instead, the present tool 10 allows the guide blocks 42 and comb plate 56 to remain assembled in the tool 10 while making a simple adjustment of the comb plate 56 in the fore-and-aft direction 32 for the size of fastener 12 that is to be applied to a belt end 16.

More specifically, the comb plate 56 is provided with two sets of identical adjustment apertures 236, as can be seen in FIGS. 3, 13 and 16. As shown, there are three apertures 236 in each set corresponding to three different size fasteners 12 that can be applied to belt ends 16 with the tool 10 using the illustrated comb plate 56. Manifestly, more or less of these apertures 236 can be provided to correspond to the number of different size fasteners 12 to be applied by the tool 10. Each of the apertures 236 in a set is offset in the fore-and-aft direction 32 for being aligned with a corresponding aperture 238 in the mounting plate 64 therebelow, as can be seen in FIGS. 14 and 20. To select one of the adjustment apertures 236 corresponding to the size of the fastener 12 to be applied to the belt end 16, the operator unclamps the clamp devices 72 so that the comb plate 56 can be slid forwardly or rearwardly to align the appropriate adjustment aperture 236 with the aperture 238 therebelow. Then, a securing member, such as in the form of detent pin 240 shown in FIGS. 2 and 3, is inserted through the aligned apertures 236 and 238 to secure the comb plate 56 against sliding on the mounting plate 64 thereunder.

Referencing FIG. 16 again, it can be seen that each set of apertures 236 includes a rearwardmost aperture 236a, an intermediate aperture 236b, and a forwardmost aperture 236c. With these apertures 236 being offset in the fore-and-aft direction 32, forwardmost aperture 236c is closest to the comb fingers 58 at the forward edge of the comb plate 56, rearwardmost aperture 236a is furthest away therefrom and closer to the rear edge of the comb plate 56, while intermediate aperture 236b is located between apertures 236a and 236c in the fore-and-aft direction 32. Referencing FIGS. 13 and 14, the mounting plate 64 has upstanding posts 242 adjacent the forward edge thereof. The comb plate 56 has openings 244 that are adjacent to the forward edge of the plate 56 and which are elongated in the fore-and-aft direction 32. The comb plate 56 is located on the mounting plate 64 by fitting the posts 242 through the corresponding comb plate openings 244, as can be seen in FIG. 13. The posts 242 and elongated openings 244 guide the comb plate 56 for sliding adjustment thereof to allow one of the apertures 236a-236c to be aligned with the corresponding underlying mounting plate aperture 238.

As illustrated, in addition to being spaced in the fore-and-aft direction 32, the apertures 236 are also spaced from each other along the length of the comb plate 56. Similarly, the apertures 238 of the mounting plate 64 are spaced lengthwise along the length of the mounting plate 64 while being aligned with each other so that with the comb plate 56 properly located on the mounting plate 64 by the posts 242 extending through the corresponding openings 244, shifting of the comb plate 56 in the fore-and-aft direction 32 will allow an operator to register any one of the apertures 236a-236b with the corresponding one of the apertures 238a-238c. In this regard, if the largest size fastener 12 is to be installed on the belt end 16, the comb plate 56 is slid rearwardly on the mounting plate 64 until the apertures 236c aligned with corresponding apertures 238c so that the forward edge of the comb plate 56 including the finger projections 58 and recesses 60 are appropriately spaced from the anvil members 34 forwardly therefrom for aligning the large fasteners 12 with respect thereto. If an operator wants to use the tool 10 for a different size fastener 12 such as the smallest size fastener 12, the operator simply unclamps the clamp devices 72, pulls the detent pins 240 out from the aligned apertures 236c and 238c, and slides the comb plate 56 forwardly on the mounting plate 64 until the apertures 236a align with underlying apertures 238a. Then, the operator inserts the detent pin 240 into the aligned apertures 236a and 238a to fix the location of the comb plate 56, and specifically the forward finger projections 58 and recesses 60 thereof relative to the anvil members 34 so that the smallest size fasteners 12 when received in the tool 10 are properly aligned with respect thereto for either the initial or final set driving operations.

In addition to the adjustment of the comb plate 56 so that the fingers 58 and recesses 60 therebetween are properly positioned relative to the anvil members 34 for the size of the fasteners 12 to be applied to the belt end 16, the comb plate 56 further includes risers 246, such as pin members or the like, projecting upwardly from the plate upper surface 56c that limit the downward travel of the guide blocks 42 when the clamped devices 72 are shifted to their clamped position. In this manner, the amount of compression force applied by the guide blocks 42 to the fastener plates 46 and 50 is appropriately tailored to the size of the fasteners 12 to be installed on the belt end 16 therebetween. As can be seen in FIG. 13, the guide blocks 42 include ribs 250 that extend about various cavities extending vertically into the block bodies such as cavity 248 for receiving the mounting plate posts 242 therein.

The risers 246 are of different heights for corresponding to the different sizes of fasteners 12 that the tool 10 can apply to belt ends 16. As shown, the risers 246a have two different heights. Referring to FIGS. 2, 16 and 17, there are larger height risers 246a and smaller height risers 246b at various locations on the comb plate 56 that are coordinated with the guide block ribs 250 so that they are engaged therewith depending on the size of fastener 12 selected. With the illustrated comb plate 56, the larger height risers 246a are generally arranged in two rows extending along the length of the plate 56. The smaller height risers 246b are also arranged in two rows extending lengthwise along the plate 56. The front row of risers 246a is closer to the forward edge of the comb plate 56 than the adjacent row of risers 246b. Similarly, the rearward row of risers 246a is disposed forwardly from the adjacent rearward row of smaller height risers 246b, as can be seen in FIGS. 2 and 16.

Thus, when the comb plate 32 is slid rearwardly to its rearwardmost position so that the apertures 236c and 238c are aligned for receiving the detent pin 240 therein, the guide block ribs 250 will be aligned with the larger height risers 246a. In this manner, when the clamp device 72 is shifted to its clamped position, the ribs 250 engage the risers 246a for setting the compression force applied to the plates 46 and 50 of the largest sized belt fasteners 12, which have a larger vertical spacing therebetween than the plates 46 and 50 of the other smaller fasteners 12. When the comb plate 56 is slid forwardly so that the apertures 236b and 238b are aligned and receive the detent pin 240 therein, the guide block ribs 250 are aligned with the smaller height risers 246b so that they engage these risers 246b while clearing the largest height risers 246a. In this instance, the operation of the clamp device 72 causes the guide block 42 to shift slightly further downwardly so that an appropriate compression force is applied to the intermediate size fastener plates 46 and 50. For the smallest size fasteners 12, the comb plate 56 is slid forwardly so that the apertures 236a and 238a are aligned and receive the detent pin 240 therethrough. In this instance, operation of the clamp device 72 will cause the ribs 250 to engage on the plate upper surface 56c with the ribs 250 clearing both sets of the risers 246a and 246b. In this instance, operation of the clamp device 72 shifts the guide blocks 42 all the way down onto the comb plate 56 for applying the appropriate compression force to the plates 46 and 50 of the smallest size belt fasteners 12.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. An apparatus for applying staple belt fasteners to conveyor belts, the apparatus comprising:
   an elongate base;
   an anvil mounted to the base having initial set portions and final set portions thereof that are each arranged in respective rows lengthwise along the base;
   a guide device having through openings for being aligned with either the row of initial set portions or the row of final set portions of the anvil; and
   an actuator operable to shift the anvil and the guide device relative to each other in a fore-and-aft direction widthwise across the base.

2. The apparatus of claim 1 wherein the actuator has an initial set position in which the guide device through openings are aligned with the initial set portions, and a final set position distinct from the initial set position in which the guide device through openings are aligned with the final set portions.

3. The apparatus of claim 1 including a power staple setting tool having a motor and a staple drive member configured to fit in the guide device openings and being driven by operation of the motor to drive legs of staples of the staple belt fasteners against the initial set portions for initial setting thereof with the guide device through openings aligned with the initial set portions, and to drive the initially set legs of the staple belt fasteners against the final set portions with the guide device through openings aligned with the final set portions.

4. The apparatus of claim 1 wherein the anvil comprises a plurality of anvil members each having initial and final set portions thereof, and the initial set portion of each of the anvil members is at a forward position thereof and the final set portion of each of the anvil members is at a rearward position thereof with the anvil members each mounted to the base so that the row of the forward, initial set portions and the row of the rearward, final set portions thereof are spaced in the fore-and-aft direction from each other extending widthwise across the base.

5. The apparatus of claim 1 wherein the anvil is mounted for translation in the fore-and-aft direction on the base by operation of the actuator.

6. The apparatus of claim 1 including a belt clamping and alignment mechanism for aligning legs of staples of the staple belt fasteners on an end of a conveyor belt with one of the anvil set portions, the belt clamping and alignment mechanism including the anvil and the guide device between which the belt having the staple belt fasteners thereon is clamped after the actuator has been operated to shift the anvil and guide device relative to each other to align the anvil initial set portions with the guide device through openings.

7. The apparatus of claim 6 wherein the belt clamping and alignment mechanism including the anvil and the guide device thereof are mounted to the base so that with the anvil initial set portions aligned with the guide device through openings operation of the actuator causes the belt clamping and alignment mechanism to lift the clamped belt and fasteners off the anvil, the anvil to translate on the base for aligning the final set portions with the guide device through openings, and the belt clamping and alignment mechanism to lower the clamped belt and fasteners so that initially set legs of the staple belt fasteners are supported on the final set portions.

8. The apparatus of claim 1 including belt lift members that are generally flush with or below the anvil after the actuator has been operated to align the guide device through opening with either the initial set portions or the final set portions, and which are raised into engagement with the clamped belt and belt fasteners thereon to lift the belt and fasteners off of the anvil so that the belt stays clamped on the belt lift members during operation of the actuator for shifting of the anvil and guide device relative to each other in the fore-and-aft direction.

9. An apparatus for applying staple belt fasteners to conveyor belts, the apparatus comprising:
   a base;
   an anvil mounted to the base including spaced initial set portions and final set portions spaced from each other on the base;
   a guide device mounted to the base having guide through openings each configured to receive a staple drive member therein; and
   an actuator operable to shift the anvil and the guide device relative to each other on the base, the actuator having an initial set position in which all of the through openings of the guide device are aligned with corresponding ones of the anvil initial set portions, and a final set position in which all of the through openings of the guide device are aligned with corresponding ones of the anvil final set portions.

10. The apparatus of claim 9 wherein the guide device comprises multiple guide blocks each with multiple guide through openings with all of the guide through openings of the multiple guide blocks being aligned with either the anvil initial set portions with the actuator in the initial set position or the anvil final set portions with the anvil in the final set position.

11. The apparatus of claim 9 wherein the base has an elongate configuration including a length sized to extend laterally across a conveyor belt, and the anvil is mounted for translation in a fore-and aft direction along the base transverse to the base length with the anvil initial and final set portions being spaced in the fore-and-aft direction.

12. The apparatus of claim 9 wherein the guide device includes a clamping device operable to clamp the belt and fasteners thereon between the guide device and the anvil with the actuator in the initial set position, and a belt lift mechanism pivotally mounted for pivoting relative to the base with shifting of the actuator from the initial set position to the final set position causing the belt lift mechanism to pivot upwardly and lift the clamped belt upwardly, the anvil to translate along the base to align the guide device through openings with the anvil final set portions, and the belt lift mechanism to pivot downwardly to lower the lifted clamped belt so that initially set staples are on the anvil final set portions.

13. The apparatus of claim 12 wherein the actuator comprises a pivotal handle that is pivoted forwardly from the initial set position to the final set position thereof, and the handle is configured to be above the belt extending beyond the base at either end thereof when the handle is pivoted forwardly to the final set position thereof.

14. The apparatus of claim 12 including a fastener alignment device for positioning the staple belt fasteners on a belt end so that staples thereof are in alignment with the guide device through openings, and wherein the anvil, the fastener alignment device and the belt lift mechanism are arranged so that as the actuator is shifted from the initial set position to the final set position the belt lift mechanism pivots upwardly and engages the fastener alignment device for causing upward pivoting thereof to lift the clamped belt and belt fasteners thereon upward to allow the anvil to be translated thereunder.

15. The apparatus of claim 14 wherein the guide device and the fastener alignment device include a mounting plate for being mounted thereto and a releasable hold-down mechanism that is operable to draw the mounting plate down toward the base with the actuator in the initial set position, and being released for pivoting of the mounting plate including the guide device and the fastener alignment device mounted thereto as the actuator is shifted from the initial set position to the final set position.

16. The apparatus of claim 15 wherein the handle includes a handle lock device operable to releasably lock the handle in the initial set position with the releasable hold-down mechanism operable to draw the mounting plate down toward the base.

17. The apparatus of claim 12 wherein the base has an elongate configuration including a length thereof, the anvil comprises a plurality of anvil members arranged alongside each other along the length of the base and having gap spacings therebetween, and the belt lift mechanism comprises lift members arranged in the gap spacings for pivoting therein with operation of the actuator.

18. The apparatus of claim 17 wherein the anvil members each include the initial set and final set portions with the initial set portion comprising recesses in each of the anvil members and the final set portion comprising a substantially flat surface of each of the anvil members.

19. The apparatus of claim 9 wherein the actuator comprises a handle, and an actuating mechanism mounted to the base and connected to the handle to be operable thereby to cause the relative shifting between the anvil and the guide device when the handle is shifted between the initial and final set positions thereof.

20. The apparatus of claim 19 wherein the actuating mechanism comprises a cam mechanism.

* * * * *